United States Patent
Koga

(10) Patent No.: US 12,463,682 B2
(45) Date of Patent: Nov. 4, 2025

(54) COMMUNICATION APPARATUS

(71) Applicant: Panasonic Intellectual Property Management Co., Ltd., Osaka (JP)

(72) Inventor: Hisao Koga, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 24 days.

(21) Appl. No.: 18/340,659

(22) Filed: Jun. 23, 2023

(65) Prior Publication Data

US 2023/0336210 A1     Oct. 19, 2023

Related U.S. Application Data

(63) Continuation of application No. PCT/JP2021/025884, filed on Jul. 9, 2021.

(60) Provisional application No. 63/139,667, filed on Jan. 20, 2021.

(51) Int. Cl.
*H04B 3/02*     (2006.01)

(52) U.S. Cl.
CPC .................................... *H04B 3/02* (2013.01)

(58) Field of Classification Search
CPC .... H04B 3/02; H04B 3/54; H04B 5/48; G06F 21/44
See application file for complete search history.

(56) References Cited

U.S. PATENT DOCUMENTS

2010/0158038 A1* 6/2010 Ohmi ............... H04L 12/40136
370/445

| 2013/0314048 A1 | 11/2013 | Washiro |
| 2013/0328528 A1 | 12/2013 | Takata et al. |

(Continued)

FOREIGN PATENT DOCUMENTS

| JP | 2009-164924 A | 7/2009 |
| JP | 2011-041228 A | 2/2011 |

(Continued)

OTHER PUBLICATIONS

Machine Translation of JP 2009-164924 (cited in the IDS of Jun. 23, 2023) obtained from https://www.wipo.int/ (Year: 2009).*

(Continued)

*Primary Examiner* — David S Huang
(74) *Attorney, Agent, or Firm* — Seed Intellectual Property Law Group LLP

(57) ABSTRACT

A communication apparatus includes a coupler that is connected to a cable to which a first communication apparatus is connected, the first communication apparatus performing communication based on a wired communication scheme; communication circuitry that is connected to the coupler; and an antenna that is connected to the coupler, radiates a signal of the wired communication scheme to a second communication apparatus, and receives a signal of the wired communication scheme from the second communication apparatus. The coupler outputs, to the cable and the antenna, the signal of the wired communication scheme outputted from the communication circuitry, outputs, to the communication circuitry and the cable, the signal of the wired communication scheme received by the antenna, and outputs, to the communication circuitry and the antenna, the signal of the wired communication scheme received from the cable.

14 Claims, 20 Drawing Sheets

(56) References Cited

U.S. PATENT DOCUMENTS

2016/0148499 A1\* 5/2016 Hicks, III ........... H04L 12/6418
340/506
2021/0006339 A1\* 1/2021 Eguchi ................... H02J 50/12

FOREIGN PATENT DOCUMENTS

| JP | 2012-175562 A | 9/2012 |
| JP | 2020-010250 A | 1/2020 |
| WO | WO 2012114950 A1 | 8/2012 |

OTHER PUBLICATIONS

International Search Report, mailed Sep. 21, 2021, for PCT Application No. PCT/JP2021/025884. (5 pages) (with English translation).

\* cited by examiner 32a-4  23

33a-2  13c 33a-2  13c 32a-4  23

COMMUNICATION APPARATUS

TECHNICAL FIELD

The present disclosure relates to a communication apparatus.

BACKGROUND ART

Patent Literature (hereinafter, referred to as PTL) 1 discloses an electricity meter including a power line communication circuit and a radio communication circuit and capable of using two communication schemes, which are power line communication (PLC) and radio communication, to perform communication.

CITATION LIST

Patent Literature

PTL 1
Japanese Patent Application Laid-Open No. 2020-010250

SUMMARY OF INVENTION

Technical Problem

The electricity meter disclosed in PTL 1 includes two circuits, which are a power line communication circuit and a radio communication circuit, resulting in cost increase.

One non-limiting and exemplary embodiment facilitates providing a communication apparatus reducing circuit size and cost.

Solution to Problem

A communication apparatus according to an embodiment of the present disclosure includes: a coupler that is connected to a cable to which a first communication apparatus is connected, the first communication apparatus performing communication based on a wired communication scheme; communication circuitry that is connected to the coupler; and an antenna that is connected to the coupler, radiates a signal of the wired communication scheme to a second communication apparatus, and receives a signal of the wired communication scheme from the second communication apparatus, wherein, the coupler outputs, to the cable and the antenna, the signal of the wired communication scheme outputted from the communication circuitry, outputs, to the communication circuitry and the cable, the signal of the wired communication scheme received by the antenna, and outputs, to the communication circuitry and the antenna, the signal of the wired communication scheme received from the cable.

It should be noted that general or specific embodiments may be implemented as a system, an apparatus, a method, an integrated circuit, a computer program, a storage medium, or any selective combination thereof.

Advantageous Effects of Invention

According to an exemplary embodiment of the present disclosure, it is possible for a communication apparatus to reduce circuit size and cost.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present invention will be described in detail with reference to the drawings as appropriate. However, a detailed description more than necessary may be omitted, such as a detailed description of a well-known matter and a duplicate description for a substantially identical configuration, to avoid unnecessary redundancy of the following description and to facilitate understanding by a person skilled in the art.

Note that, the accompanying drawings and the following description are provided for the person skilled in the art to sufficiently understand the present disclosure, and are not intended to limit the subject matter described in the claims.

Embodiment 1

Figure 1:
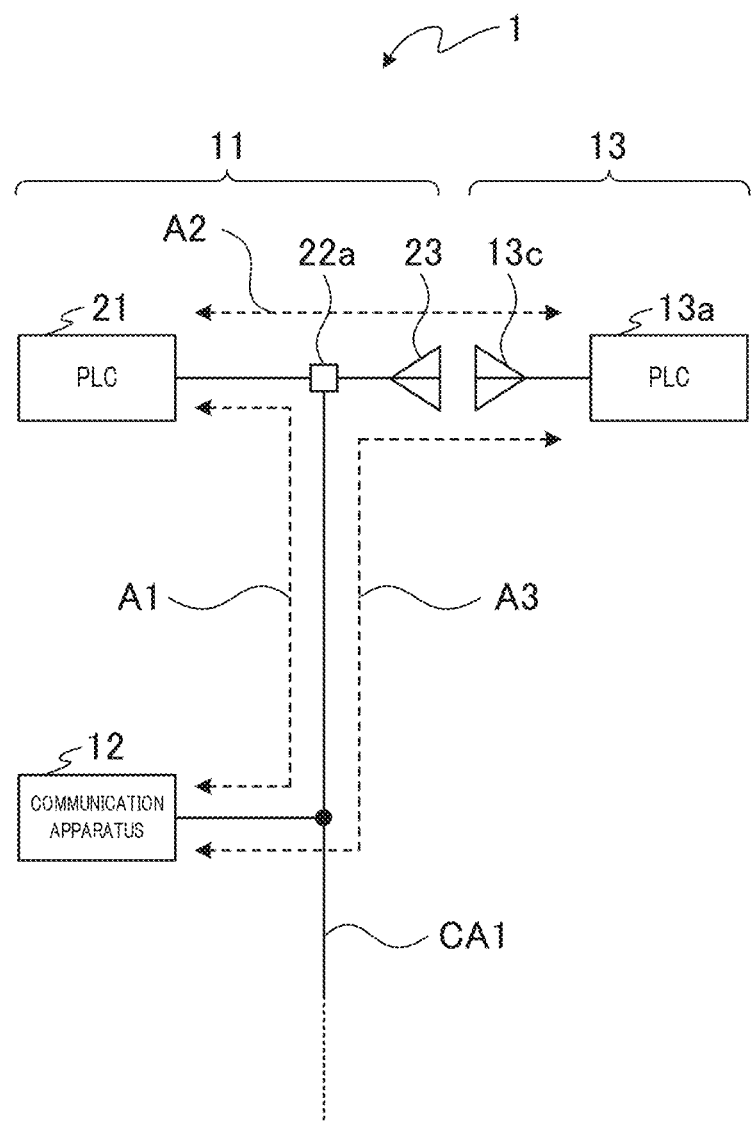
FIG. 1 illustrates an exemplary configuration of a communication system according to Embodiment 1.

FIG. 1 illustrates an exemplary configuration of communication system 1 according to Embodiment 1. As illustrated in FIG. 1, communication system 1 includes communication apparatuses 11 to 13. Communication apparatus 11 includes PLC 21, coupler 22a, and antenna 23. Communication apparatus 13 includes PLC 13a and antenna 13c.

PLC 21 of communication apparatus 11 and PLC 13a of communication apparatus 13 perform communication based on PLC. Communication apparatus 12 also includes a PLC (not illustrated) and performs communication based on PLC.

Communication apparatuses 11 and 12 are connected to cable CA1. As illustrated in FIG. 1, communication apparatus 11 is connected to cable CA1 via coupler 22a of communication apparatus 11. Note that cable CA1 may be a DC power line or an AC power line. Cable CA1 may also be a communication line.

Communication apparatuses 11 and 12 perform PLC via coupler 22a of communication apparatus 11 and cable CA1 as indicated by dotted arrow A1. That is, communication apparatuses 11 and 12 perform PLC by wire.

Communication apparatuses 11 and 13 perform PLC via coupler 22a of communication apparatus 11, antenna 23 of communication apparatus 11, and antenna 13c of communication apparatus 13, as indicated by dotted arrow A2. That is, communication apparatuses 11 and 13 perform PLC by radio.

Antenna 23 included in communication apparatus 11 is composed of a coil. Antenna 13c included in communication apparatus 13 is composed of a coil. Communication apparatuses 11 and 13 perform short-range radio communication by magnetic field coupling via the coils, and the radio communication distance is, for example, from several centimeters to several tens of centimeters. Note that the coil configuration in antenna 23 is based on N windings, where N is 1 or more.

Communication apparatuses 12 and 13 perform PLC via cable CA1, coupler 22a of communication apparatus 11, antenna 23 of communication apparatus 11, and antenna 13c of communication apparatus 13, as indicated by dotted arrow A3.

When communication apparatuses 12 and 13 communicate with each other, communication apparatus 11 can be regarded as a bridge apparatus. That is, communication apparatus 11 can be regarded as a bridge apparatus that bridges PLC between communication apparatus 12, which is a wired communication apparatus, and communication apparatus 13, which is a radio communication apparatus. Thus, communication apparatus 12, which is a wired communication apparatus, may be simply connected to communication apparatus 11 via cable CA1 when communicating with communication apparatus 13, which is a radio communication apparatus. This allows communication apparatus 12, which is a wired communication apparatus, to perform radio communication via communication apparatus 11.

As described above, communication apparatuses 11 and 13 perform short-range radio communication via the coils. That is, communication apparatuses 11 and 13 transmit and receive a PLC signal directly (as it is) via the coils. Communication apparatus 11 transmits a PLC signal to communication apparatus 13 without radio circuitry such as an up-converter. In addition, communication apparatus 11 receives a PLC signal from communication apparatus 13 without radio circuitry such as a down-converter. For example, communication apparatuses 11 and 12 receive, via antenna 23 and coupler 22a, a PLC signal transmitted (radiated) by communication apparatus 13 (PLC 13a) via antenna 13c. Further, antenna 23 receives a PLC signal transmitted (radiated) by communication apparatus 13 (PLC 13a) via antenna 13c, and outputs the received PLC signal to PLC 21 and cable CA1. In other words, antenna 23 relays a PLC signal transmitted (radiated) by communication apparatus 13 (PLC 13a) via antenna 13c to PLC 21 and cable CA1.

Communication apparatus 12 is connected to antenna 23 of communication apparatus 11 via cable CA1 and coupler 22a of communication apparatus 11. Thus, communication apparatuses 12 and 13 directly transmit and receive a PLC signal via antenna 23 of communication apparatus 11 and antenna 13c of communication apparatus 13 (via the coils). That is, communication apparatus 11 transmits (bridges) a PLC signal of communication apparatus 12 to communication apparatus 13 without radio circuitry such as an up-converter. In addition, communication apparatus 11 receives a PLC signal of communication apparatus 13 and transmits (bridges) the PLC signal to communication apparatus 12 without radio circuitry such as a down-converter.

Figure 2:
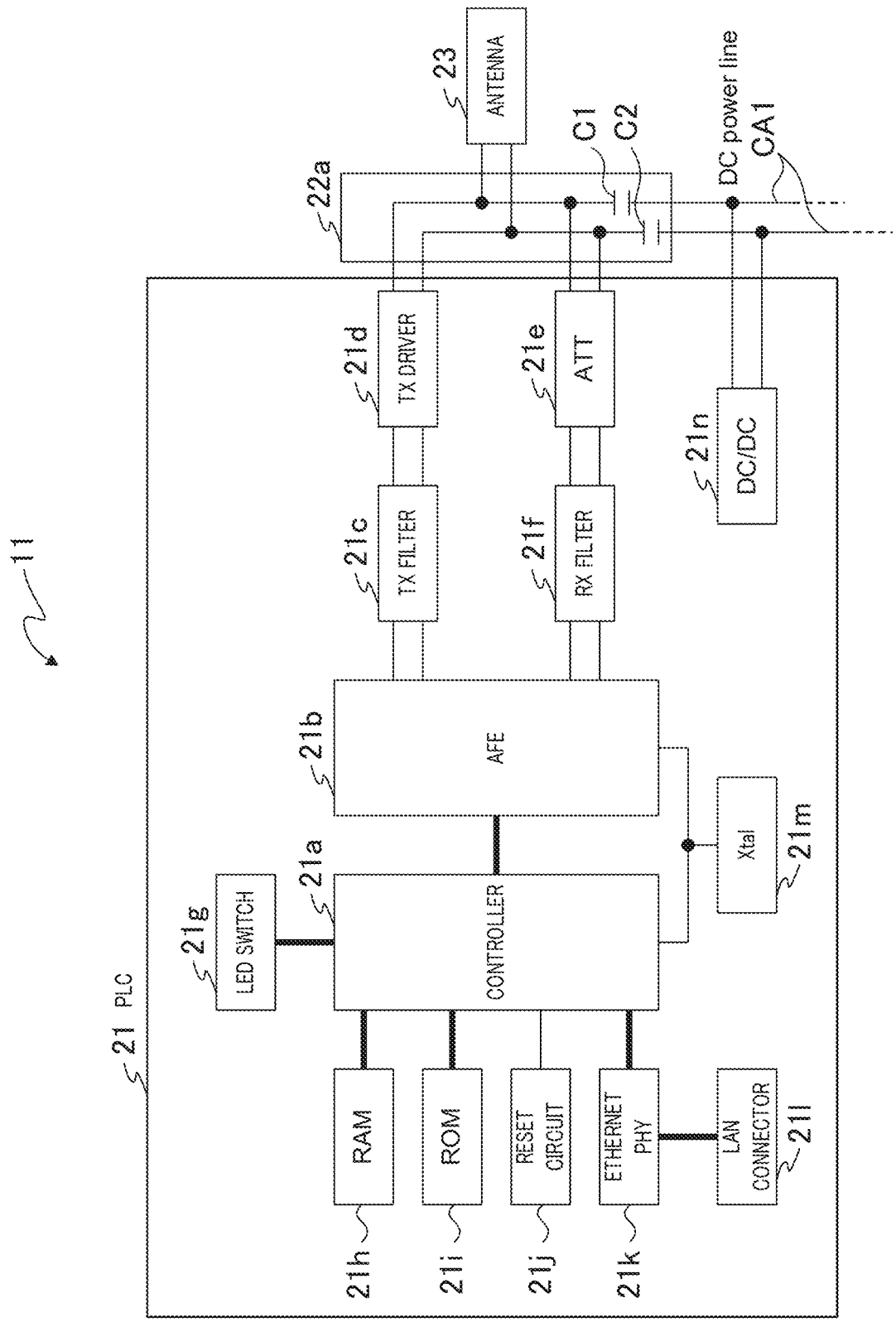
FIG. 2 illustrates an exemplary block configuration of a communication apparatus.

FIG. 2 illustrates an exemplary block configuration of communication apparatus 11. In FIG. 2, the same components as those in FIG. 1 are denoted by the same reference signs. As illustrated in FIG. 2, communication apparatus 11 includes PLC 21, coupler 22a, and antenna 23 that are illustrated in FIG. 1.

FIG. 2 also illustrates cables CA1 illustrated in FIG. 1. Cables CA1 illustrated in FIG. 2 are DC power lines that carry a DC current or a DC voltage.

PLC 21 is connected to cables CA1 via coupler 22a. Coupler 22a includes capacitors C1 and C2 as illustrated in FIG. 2. Capacitors C1 and C2 are coupling capacitors that block the inflow of DC power of cables CA1 and transmit a PLC signal. Note that coupler 22a may include a connector connected to cables CA1.

PLC 21 includes controller 21a, AFE 21b, TX filter 21c, TX driver 21d, ATT 21e, RX filter 21f, LED switch 21g, RAM 21h, ROM 21i, reset circuit 21j, Ethernet (registered trademark) PHY 21k, LAN connector 211, Xtal 21m, and DC/DC 21n. Note that AFE is an abbreviation for an analog front end. ATT is an abbreviation for an attenuator. RAM is an abbreviation for random access memory. LAN is an abbreviation for a local area network. DC is an abbreviation for a direct current. PLC 21 may be referred to as a PLC modem.

Controller 21a controls the entire PLC 21. For example, controller 21a performs transmission processing, reception processing, and relay processing on a PLC signal. To be more specific, controller 21a performs physical layer processing, MAC layer processing, multi-hop processing, etc. on a PLC signal based on the IEEE1901a standard. Note that IEEE is an abbreviation for the Institute of Electrical and Electronics Engineers. MAC is an abbreviation for media access control.

Controller 21a is composed of, for example, a CPU, DSP, or HD-PLC IC. Note that CPU is an abbreviation for a central processing unit. DSP is an abbreviation for a digital signal processor. HD-PLC IC is an abbreviation for a high definition-PLC integrated circuit.

AFE 21b mediates signal processing between controller 21a and analog circuitry (TX filter 21c, TX driver 21d, ATT 21*e*, and RX filter 21*f*). For example, AFE 21*b* converts a digital signal outputted from controller 21*a* into an analog signal, and outputs the analog signal to the analog circuitry. AFE 21*b* also converts an analog signal outputted from the analog circuitry into a digital signal, and outputs the digital signal to controller 21*a*.

TX filter 21*c* is, for example, a low-pass filter. TX filter 21*c* blocks a frequency band equal to or higher than a predetermined value of a PLC signal outputted from AFE 21*b*, and outputs the signal to TX driver 21*d*.

TX driver 21*d* amplifies the PLC signal outputted from TX filter 21*c* and outputs the amplified signal to coupler 22*a*.

ATT 21*e* attenuates a PLC signal carried in coupler 22*a* and outputs the signal to RX filter 21*f*.

RX filter 21*f* is, for example, a band-pass filter. RX filter 21*f* blocks a frequency band equal to or lower than a predetermined value and a frequency band equal to or higher than a predetermined value of the PLC signal outputted from ATT 21*e*, and outputs the signal to AFE 21*b*.

LED switch 21*g* is a switch including an LED. LED switch 21*g* outputs a signal corresponding to a user operation to controller 21*a*.

RAM 21*h* stores a part of a program executed by controller 21*a*. RAM 21*h* also temporarily stores various data used for processing in controller 21*a*. RAM 21*h* is memory that temporarily stores a program and data, and may be synchronous dynamic (SD) RAM, for example.

ROM 21*i* stores a program executed by controller 21*a*. ROM 21*i* also stores various data used for processing in controller 21*a*. ROM 21*i* is memory that permanently stores a program and data, and may be flash memory, for example.

Reset circuit 21*j* is a circuit that outputs a reset signal to controller 21*a*. Reset circuit 21*j* outputs a reset signal to controller 21*a* when detecting malfunction of communication apparatus 11 or in response to a user's operation, for example.

Ethernet PHY 21*k* performs reception processing on an Ethernet signal received from a LAN cable connected to LAN connector 21*l*, and outputs the signal to controller 21*a*. Ethernet PHY 21*k* also converts a signal outputted from controller 21*a* into an Ethernet signal, and outputs the signal to LAN connector 21*l*.

Xtal 21*m* outputs a clock signal to controller 21*a* and AFE 21*b*. Controller 21*a* and AFE 21*b* operate in synchronization with the clock signal from Xtal 21*m*.

DC/DC 21*n* converts the DC voltage supplied from cables CA1 into a DC voltage of the magnitude at which PLC 21 drives. DC/DC 21*n* supplies the voltage-converted DC voltage to each component of PLC 21.

Antenna 23 is composed of a coil. Coupler 22*a* connects TX driver 21*d* and ATT 21*e* to antenna 23. Coupler 22*a* also connects TX driver 21*d* and ATT 21*e* to cables CA1 via capacitors C1 and C2. In addition, coupler 22*a* connects antenna 23 and cables CA1 via capacitors C1 and C2. The wiring distance between antenna 23 and PLC 21 is shorter than the length of cable CA1 connecting communication apparatus 11 and communication apparatus 12.

A PLC signal transmitted from communication apparatus 11 to communication apparatus 13 is outputted from TX driver 21*d* to coupler 22*a* without using radio circuitry such as an up-converter. The PLC signal outputted to coupler 22*a* is outputted to antenna 23 and transmitted to communication apparatus 13.

A PLC signal transmitted from communication apparatus 13 to communication apparatus 11 is received by antenna 23. The PLC signal received by antenna 23 is outputted to ATT 21*e* via coupler 22*a* without using radio circuitry such as a down-converter.

A PLC signal transmitted from communication apparatus 12 to communication apparatus 13 is outputted to coupler 22*a* via cables CA1. The PLC signal outputted to coupler 22*a* is transmitted to communication apparatus 13 via antenna 23 without using radio circuitry such as an up-converter.

A PLC signal transmitted from communication apparatus 13 to communication apparatus 12 is received by antenna 23. The PLC signal received by antenna 23 is outputted to cables CA1 via coupler 22*a* without using radio circuitry such as a down-converter, and transmitted to communication apparatus 12.

When communication apparatus 12 is connected to cables CA1 to which communication apparatus 11 is connected, it is connected to antenna 23 of communication apparatus 11 via cables CA1 and coupler 22*a* of communication apparatus 11. It is thus considered that communication apparatus 12 performs PLC by radio with communication apparatus 13 using antenna 23 of communication apparatus 11.

Although described in Embodiment 3, PLC 21 of communication apparatus 11 may perform relay (amplification) processing on a PLC signal transmitted from communication apparatus 12 to communication apparatus 13. PLC 21 of communication apparatus 11 may also perform relay processing on a PLC signal transmitted from communication apparatus 13 to communication apparatus 12. Even when communication apparatus 11 performs relay processing on a PLC signal, radio circuitry is not required. Note that the relay may be referred to as multi-hop or retransmission. PLC 21, coupler 22*a*, and antenna 23 of communication apparatus 11 may be separated or integrated.

Figure 3:
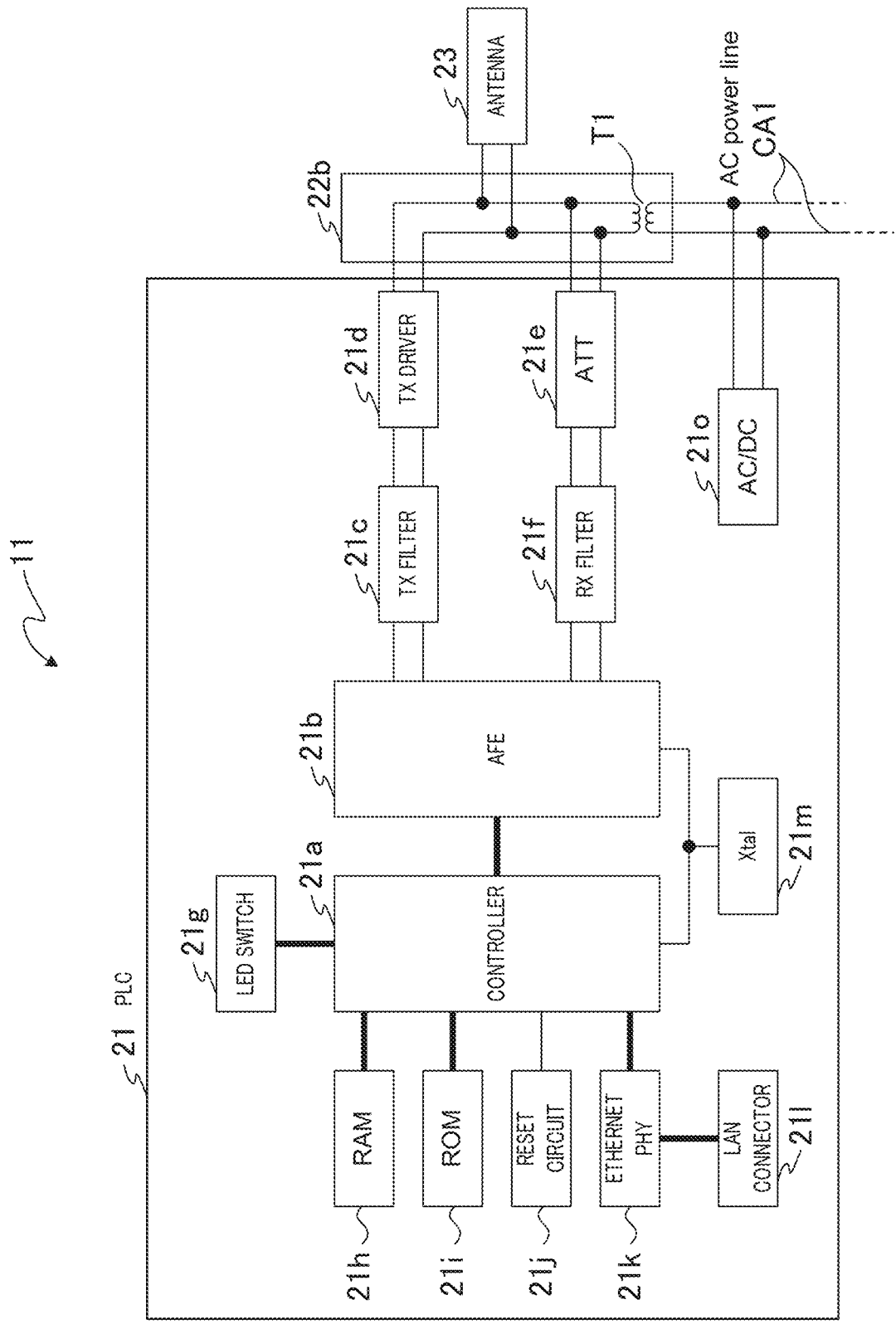
FIG. 3 illustrates another exemplary block configuration of the communication apparatus.

FIG. 3 illustrates another exemplary block configuration of communication apparatus 11. In FIG. 3, the same components as those in FIG. 2 are denoted by the same reference signs. In the following, components different from those in FIG. 2 will be described.

Cables CA1 illustrated in FIG. 3 are AC power lines that carry an AC current or an AC voltage. As illustrated in FIG. 3, PLC 21 includes AC/DC 210 and coupler 22*b*. AC is an abbreviation for an alternating current.

AC/DC 210 converts the AC voltage supplied from cables CA1 into a DC voltage of the magnitude at which PLC 21 drives. AC/DC 210 supplies the voltage-converted DC voltage to each component of PLC 21.

Coupler 22*b* includes transformer T1. Transformer T1 provides AC isolation between cables CA1 and PLC 21. Transformer T1 also provides AC isolation between cables CA1 and antenna 23.

Coupler 22*b* connects TX driver 21*d* and ATT 21*e* to antenna 23. Coupler 22*b* also connects TX driver 21*d* and ATT 21*e* to cables CA1 via transformer T1. In addition, coupler 22*b* connects antenna 23 and cables CA1 via transformer T1.

Figure 4:
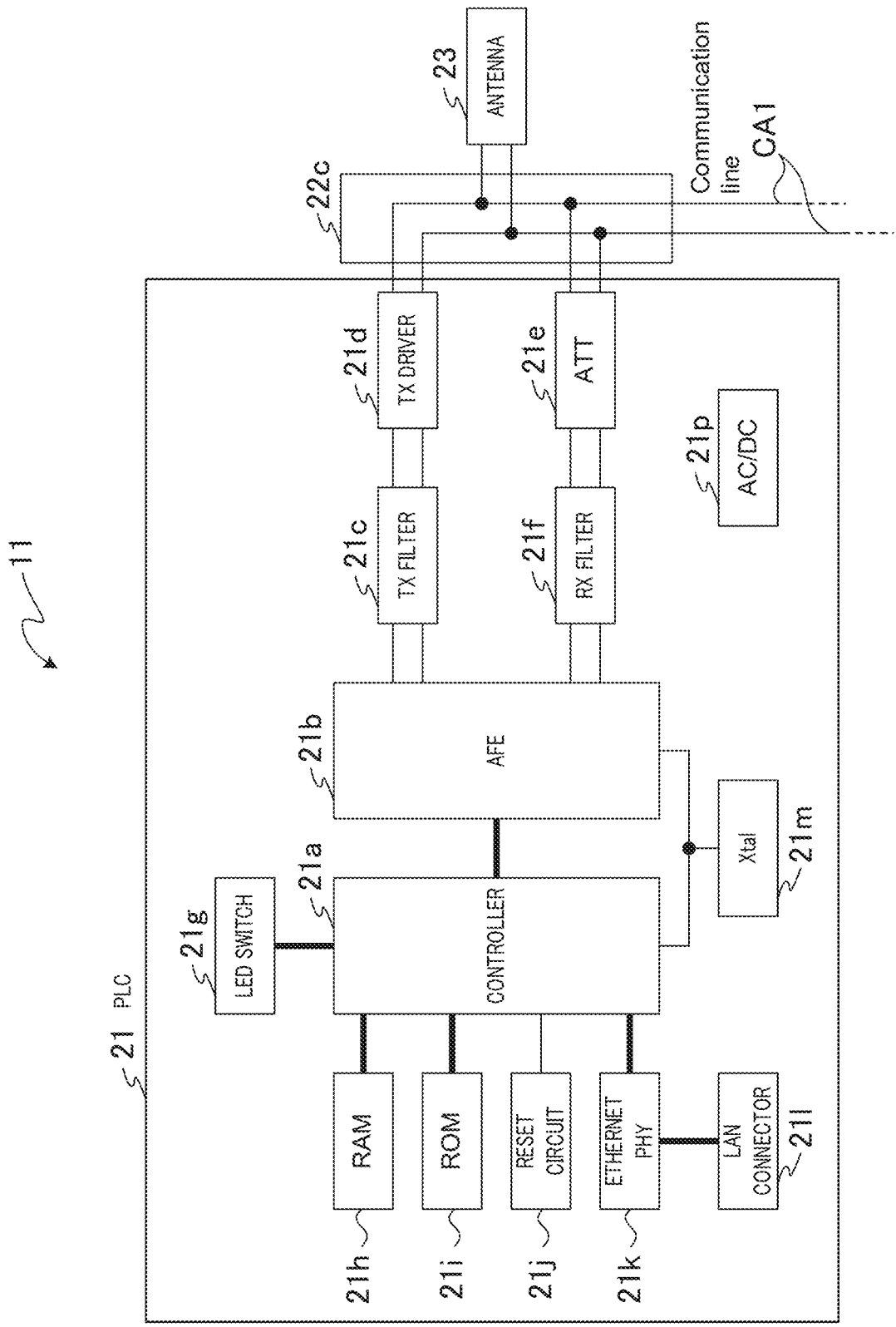
FIG. 4 illustrates still another exemplary block configuration of the communication apparatus.

FIG. 4 illustrates still another exemplary block configuration of communication apparatus 11. In FIG. 4, the same components as those in FIG. 2 are denoted by the same reference signs. In the following, components different from those in FIG. 2 will be described.

Cables CA1 illustrated in FIG. 4 are communication lines that transmit a PLC signal. Cables CA1 are, for example, twisted pair lines, coaxial lines, or parallel lines. As illustrated in FIG. 4, PLC 21 includes AC/DC 21*p* and coupler 22*c*.

For example, AC/DC 21p converts an AC voltage supplied from a household power source (not illustrated) into a DC voltage of the magnitude at which PLC 21 drives. AC/DC 21p supplies the voltage-converted DC voltage to each component of PLC 21.

Unlike coupler 22a described in FIG. 2 and coupler 22b described in FIG. 3, coupler 22c does not include capacitors C1 and C2 or transformer T1 required to isolate DC or AC. Coupler 22c directly connects TX driver 21d, ATT 21e, antenna 23, and cables CA1.

As illustrated in FIG. 4, cables CA1 may be communication lines. In this case, coupler 22c need not includes an element such as a capacitor and a transformer. In the following, couplers 22a to 22c are sometimes simply referred to as coupler 22 unless they are distinguished from each other.

The impedance of cable CA1, coupler 22, and antenna 23 will be described. The impedance of cable CA1, coupler 22, and antenna 23 should be matched. In a case where cable CA1 is a 50Ω coaxial line, for example, the impedance of each of coupler 22 and antenna 23 should also be 50Ω.

Note that the impedance of antenna 23 may be greater than the impedance of each of cable CA1 and coupler 22. Alternatively, the impedance of antenna 23 may be set to high impedance. In this case, a PLC signal passing through coupler 22 and flowing to antenna 23 is smaller than a PLC signal flowing through cable CA1. This shortens the communication distance of a PLC signal transmitted by radio from antenna 23, thereby preventing interference. Alternatively, a PLC signal flowing through cable CA1 is larger than that in antenna 23, thereby extending the communication distance using cable CA1.

As described above, communication apparatus 11 includes coupler 22 connected to cable CA1 to which communication apparatus 12 communicating based on PLC is connected, PLC 21 connected to coupler 22, and antenna 23 that is connected to coupler 22, radiates a PLC signal to communication apparatus 13, and receives a PLC signal from communication apparatus 13. Coupler 22 outputs a PLC signal outputted from PLC 21 to cable CA1 and antenna 23, outputs a PLC signal received by antenna 23 to PLC 21 and cable CA1, and outputs a PLC signal received from cable CA1 to PLC 21 and antenna 23.

As described above, since PLC 21 is connected, via coupler 22, to antenna 23 that radiates and receives a PLC signal, communication apparatus 11 need not include, for example, radio circuitry that up-converts a PLC signal to be transmitted to communication apparatus 13 and radio circuitry that down-converts a PLC signal received from antenna 23. In addition, since communication apparatus 12 connected to communication apparatus 11 via cable CA1 is connected, via coupler 22 of communication apparatus 11, to antenna 23 that radiates and receives a PLC signal, communication apparatus 11 need not include radio circuitry that up-converts a PLC signal to be transmitted from communication apparatus 12 to communication apparatus 13 and radio circuitry that down-converts a PLC signal received from antenna 23. The radio circuitry here refers to communication processing other than the communication method realized by PLC 21 (e.g., optimal communication method for a frequency, such as up-conversion to the 2.4 GHz band, which is a frequency band not realized by PLC 21: wireless LAN, Bluetooth, Zigbee, or other communication methods). Therefore, communication apparatus 11 facilitates reducing circuit size and cost.

Embodiment 2

In Embodiment 2, a description will be given of a case where the communication system according to Embodiment 1 is applied to a terminal charging system.

Figure 5:
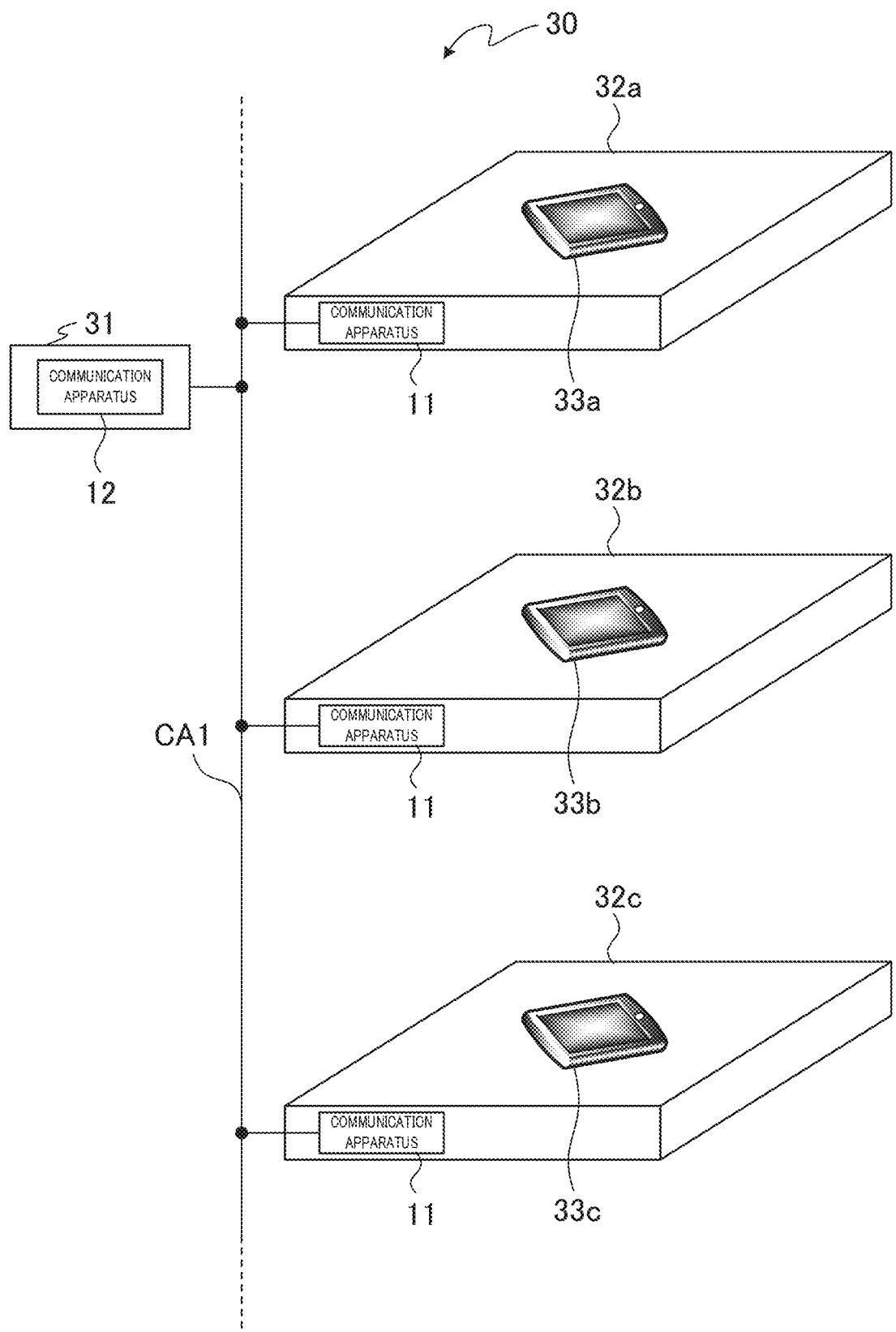
FIG. 5 illustrates an exemplary configuration of a terminal charging system according to Embodiment 2.

FIG. 5 illustrates an exemplary configuration of terminal charging system 30 according to Embodiment 2. As illustrated in FIG. 5, terminal charging system 30 includes base unit 31, chargers 32a to 32c, and terminals 33a to 33c. Terminals 33a to 33c are, for example, smartphones, tablets, or cell phones.

Base unit 31 includes communication apparatus 12 described in Embodiment 1. Chargers 32a to 32c each include communication apparatus 11 described in Embodiment 1. Terminals 33a to 33c each include communication apparatus 13 (not illustrated) described in Embodiment 1. Communication apparatus 12 of base unit 31 and communication apparatuses 11 of chargers 32a to 32c are connected to each other via cable CA1.

After authentication processing, which will be described later, chargers 32a to 32c perform wireless charging on terminals 33a to 33c placed on chargers 32a to 32c. Chargers 32a to 32c perform wireless charging based on the Qi standard, for example. Note that the wireless charging may be referred to as wireless power transfer.

Communication apparatus 12 of base unit 31 performs PLC with communication apparatuses 13 mounted on terminal 33a to 33c via communication apparatuses 11 mounted on chargers 32a to 32c. Communication apparatus 12 of base unit 31 performs authentication processing for terminals 33a to 33c through the PLC with communication apparatuses 13 mounted on terminals 33a to 33c.

According to a result of the authentication processing for terminals 33a to 33c, communication apparatus 12 of base unit 31 instructs communication apparatuses 11 of chargers 32a to 32c to start charging terminals 33a to 33c. With this procedure, for example, only terminals 33a to 33c registered in advance in base unit 31 are charged when they are placed on chargers 32a to 32c.

Note that the number of chargers 32a to 32c is not limited to the example of FIG. 5. There may be one or two chargers, or four or more chargers. The authentication processing for terminals 33a to 33c may be performed by a server (not illustrated) connected to communication apparatus 12 of base unit 31.

Figure 6:
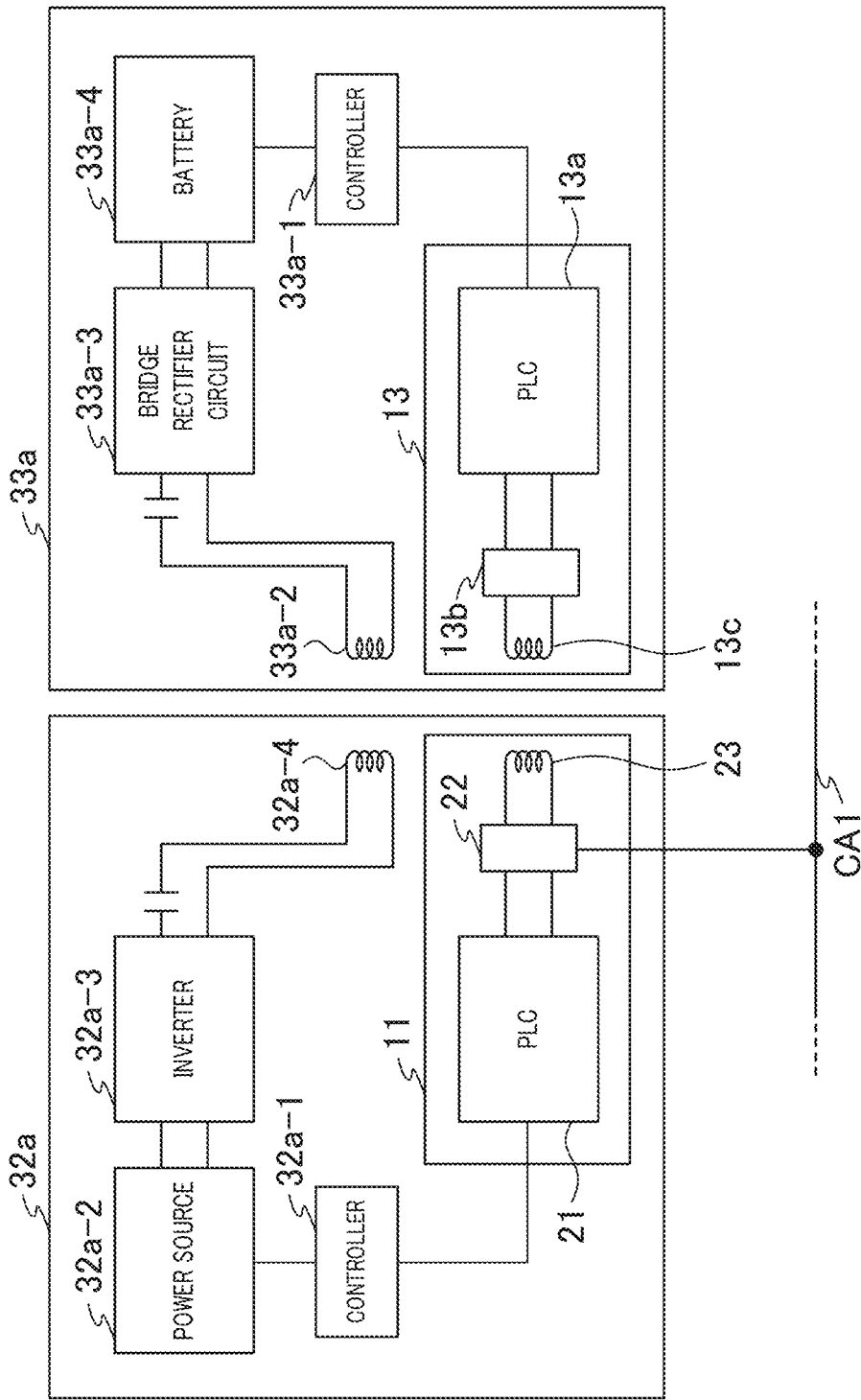
FIG. 6 illustrates an exemplary block configuration of a charger and a terminal.

FIG. 6 illustrates an exemplary block configuration of charger 32a and terminal 33a. As illustrated in FIG. 6, charger 32a includes communication apparatus 11, controller 32a-1, power source 32a-2, inverter 32a-3, and coil 32a-4.

Communication apparatus 11 includes PLC 21, coupler 22, and antenna 23. PLC 21, coupler 22, and antenna 23 are the same as PLC 21, coupler 22, and antenna 23 described in Embodiment 1, and thus the description thereof will be omitted.

Controller 32a-1 controls the entire charger 32a. Controller 32a-1 is, for example, a CPU. Controller 32a-1 implements predetermined functions based on programs and data stored in memory (not illustrated).

Controller 32a-1 receives a charging start signal and a charging end signal transmitted from base unit 31 via communication apparatus 11 and cable CA1. Controller 32a-1 outputs a power supply signal to power source 32a-2 in response to the charging start signal from base unit 31. Controller 32a-1 outputs a power stop signal to power source 32a-2 in response to the charging end signal from base unit 31.

Power source 32a-2 outputs power to inverter 32a-3 in response to the power supply signal outputted from controller 32a-1. Power source 32a-2 stops the power output to inverter 32a-3 in response to the power stop signal outputted from controller 32a-1. Note that power source 32a-2 may be connected to cable CA1 when cable CA1 is a DC power line or an AC power line. Power source 32a-2 may be supplied with power from cable CA1.

Inverter 32a-3 converts the power outputted from power source 32a-2 into power of a predetermined frequency, and outputs the power to coil 32a-4.

Coil 32a-4 transmits the power outputted from inverter 32a-3 to coil 33a-2 of terminal 33a by, for example, electromagnetic induction.

Terminal 33a includes communication apparatus 13, controller 33a-1, coil 33a-2, bridge rectifier circuit 33a-3, and battery 33a-4.

Communication apparatus 13 includes PLC 13a, coupler 13b, and antenna 13c. PLC 13a, coupler 13b, and antenna 13c of communication apparatus 13 may be the same as PLC 21, coupler 22, and antenna 23 described in Embodiment 1. Note that coupler 13b of communication apparatus 13 is not connected to a cable. Coupler 13b is not illustrated in FIG. 1.

Controller 33a-1 controls the entire terminal 33a. Controller 33a-1 is, for example, a CPU. Controller 33a-1, for example, implements predetermined functions based on programs and data stored in memory (not illustrated).

Controller 33a-1 performs PLC with communication apparatus 12 of base unit 31 via communication apparatus 13 of terminal 33a, communication apparatus 11 of charger 32a, and cable CA1. Controller 33a-1 transmits authentication information of terminal 33a to base unit 31 when, for example, terminal 33a is placed on charger 32a and starts PLC with base unit 31.

Note that base unit 31 transmits the charging start signal to charger 32a when determining that terminal 33a is a pre-registered terminal based on the authentication information of terminal 33a. This causes charger 32a to start charging terminal 33a.

In addition, controller 33a-1 monitors the voltage of battery 33a-4 and transmits a full charge signal to base unit 31 when determining that battery 33a-4 is fully charged.

Base unit 31 transmits the charging end signal to charger 32a in response to the full charge signal from terminal 33a. This causes charger 32a to end the charge of terminal 33a.

Coil 33a-2 receives power transmitted from charger 32a.

Bridge rectifier circuit 33a-3 rectifies the power received by coil 33a-2. Bridge rectifier circuit 33a-3 outputs the rectified power to battery 33a-4.

Note that chargers 32b and 32c and terminals 33b and 33c also have the same block configuration as in FIG. 6 although FIG. 6 illustrates the block configuration of charger 32a and terminal 33a.

Figure 7:
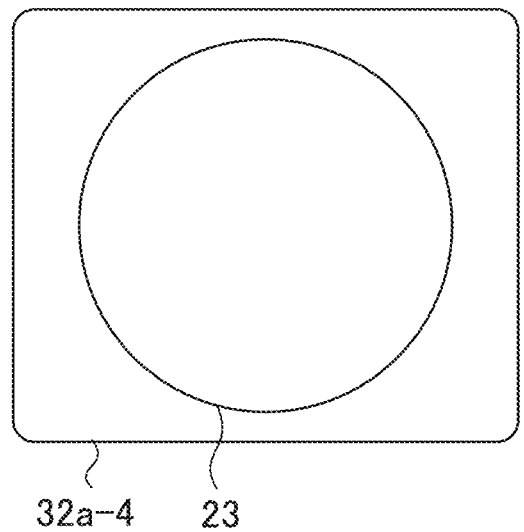
FIG. 7 is a top view of an antenna of the communication apparatus and a coil of a charger.

FIG. 7 is a top view of antenna 23 of communication apparatus 11 and coil 32a-4 of charger 32a. Antenna 23 of communication apparatus 11 mounted on charger 32a and coil 32a-4 of charger 32a are formed in the same plane, for example. Antenna 23 of communication apparatus 11 is formed inside of coil 32a-4 of charger 32a, for example.

Figure 8:
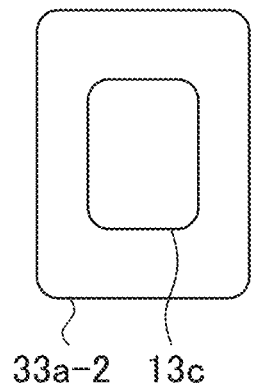
FIG. 8 is a top view of an antenna of a communication apparatus and a coil of the terminal.

FIG. 8 is a top view of antenna 13c of communication apparatus 13 and coil 33a-2 of terminal 33a. Antenna 13c of communication apparatus 13 mounted on charger 33a and coil 33a-2 of terminal 33a are formed in the same plane, for example. Antenna 13c of communication apparatus 13 is formed inside of coil 33a-2 of terminal 33a, for example.

Figure 9:
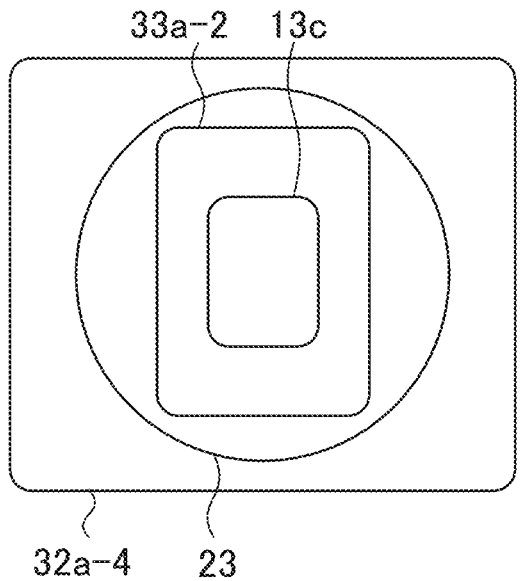
FIG. 9 is a top view of antennas when the terminal is placed on the charger.

FIG. 9 is a top view of antennas when terminal 33a is placed on charger 32a. Terminal 33a is preferably placed on charger 32a so that coil 33a-2 of terminal 33a is located inside of coil 32a-4 of charger 32a. This prevents a decrease in the coupling of the magnetic field between coil 32a-4 and coil 33a-2, thereby preventing a decrease in charging efficiency.

In addition, terminal 33a is preferably placed on charger 32a so that antenna 13c of communication apparatus 13 mounted on terminal 33a is located inside of antenna 23 of communication apparatus 11 mounted on charger 32a. This prevents weakening of the magnetic field coupling between antenna 23 of communication apparatus 11 and antenna 13c of communication apparatus 13, thereby preventing a decrease in communication efficiency.

Note that the frequency used for power transmission is, for example, 100 kHz to 200 kHz (both inclusive). The frequency used for PLC signal transmission is, for example, 2 MHz to 28 MHz (both inclusive).

As described above, base unit 31 of terminal charging system 30 includes communication apparatus 12 described in Embodiment 1, chargers 32a to 32c each include communication apparatus 11 described in Embodiment 1, and terminals 33a to 33c each include communication apparatus 13 described Embodiment 1. Base unit 31 communicates with terminals 33a to 33c via cable CA1, coupler 22, and antenna 23, and performs authentication processing for terminals 33a to 33c. Since chargers 32a to 32c each include communication apparatus 11 described in Embodiment 1, the circuit size of chargers 32a to 32c is reduced, and terminal charging system 30 can reduce cost.

Embodiment 3

In Embodiment 3, a description will be given of a case where the communication system according to Embodiment 1 is applied to a mobility charging system.

Figure 10:
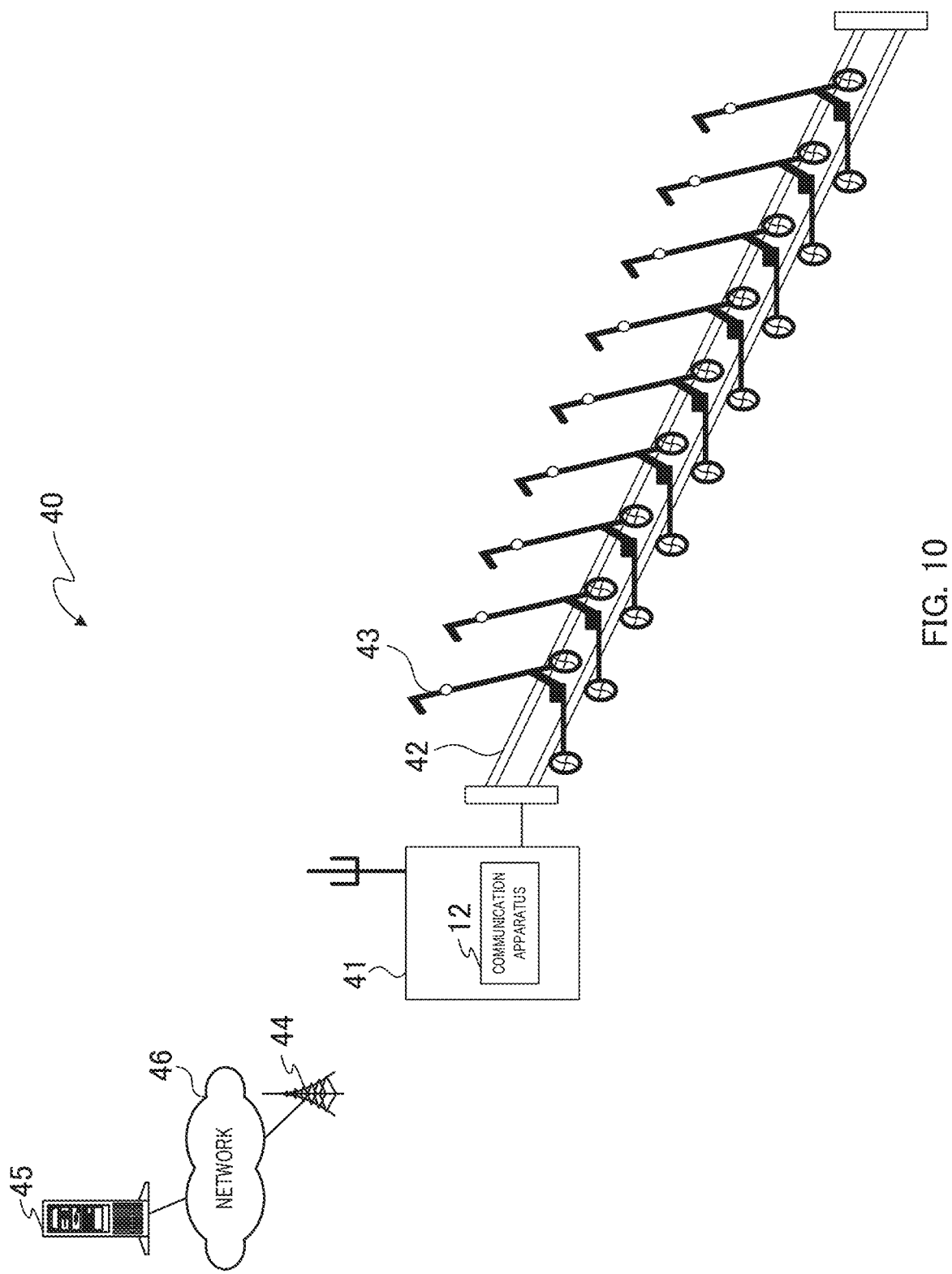
FIG. 10 illustrates an exemplary configuration of a mobility charging system according to Embodiment 3.

FIG. 10 illustrates an exemplary configuration of mobility charging system 40 according to Embodiment 3. As illustrated in FIG. 10, mobility charging system 40 includes station 41, stand 42, e-scooters 43, and server 45.

E-scooters 43 are propped up in fixed positions of stand 42 respectively. When propped up in a fixed position of stand 42, e-scooter 43 is charged by a charger (not illustrated) provided in stand 42. Hereinafter, the position of stand 42 in which e-scooter 43 is propped up is referred to as a prop-up position.

Station 41 includes communication apparatus 12 described in Embodiment 1. Communication apparatus 12 of station 41 communicates with server 45 via base station 44 and network 46.

Communication apparatus 12 of station 41 communicates by radio with base station 44, for example, based on a standard of a cell phone system such as 5G or LTE. Note that 5G is an abbreviation for 5th generation. LTE is an abbreviation for long term evolution. Network 46 is, for example, the Internet.

Server 45 performs authentication processing for e-scooter 43. As described later, the charge of e-scooter 43 starts upon successful authentication by server 45. In addition, server 45 performs payment processing according to the usage time of e-scooter 43.

Note that communication apparatus 12 of station 41 may be connected to network 46 by wire and communicate with server 45.

Figure 11:
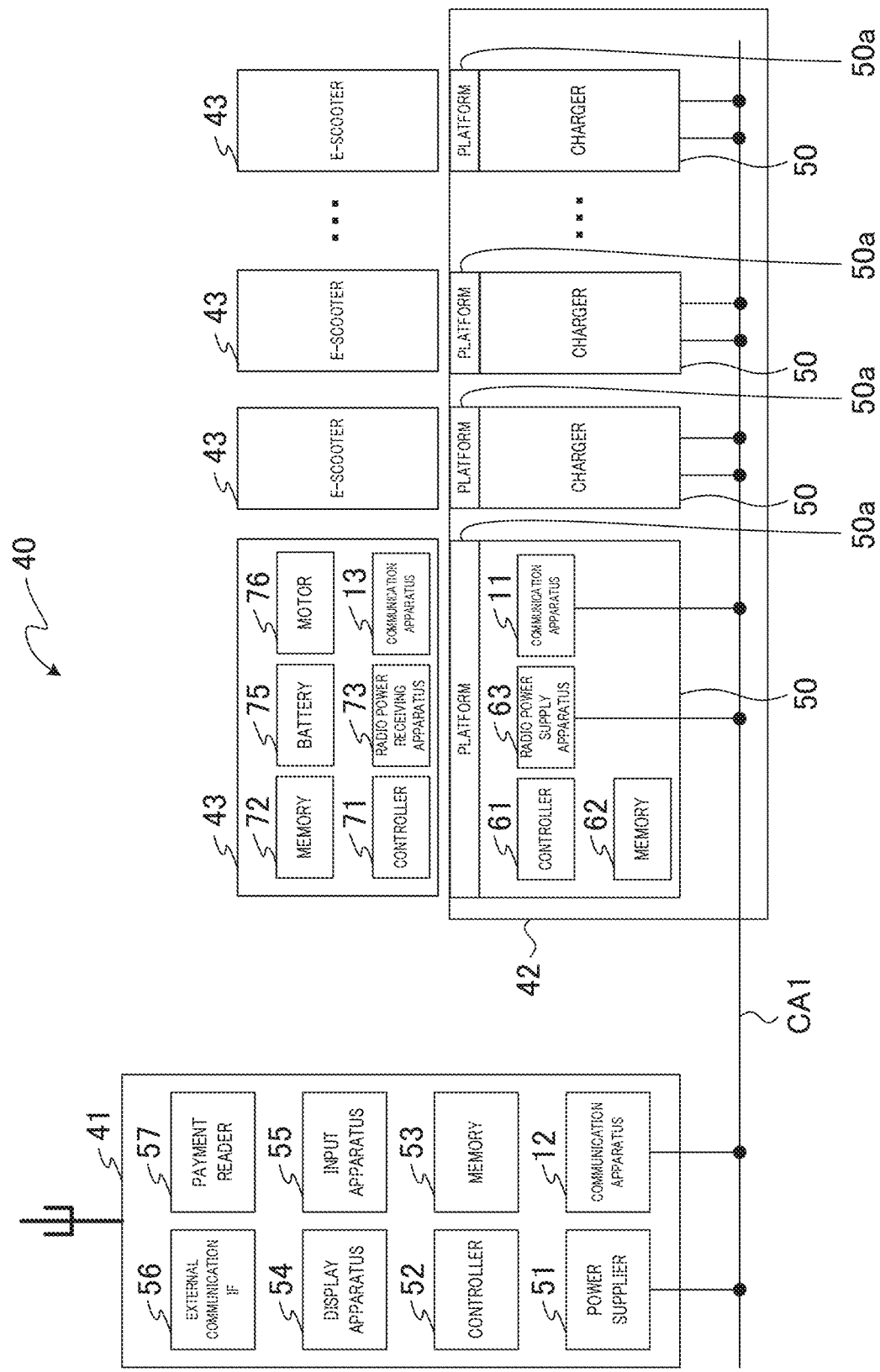
FIG. 11 illustrates an exemplary block configuration of the mobility charging system.

FIG. 11 illustrates an exemplary block configuration of mobility charging system 40. FIG. 11 illustrates exemplary block configurations of station 41, stand 42, and e-scooters 43. In FIG. 11, the same components as those in FIG. 10 are denoted by the same reference signs.

As illustrated in FIG. 11, station 41 is connected to cable CA1. A part of cable CA1 is routed in stand 42. In FIG. 11, cable CA1 is a DC power line or an AC power line.

Stand 42 includes chargers 50 and platforms 50a. Chargers 50 are connected to cable CA1 routed in stand 42. E-scooters 43 are propped up on platforms 50a respectively.

An exemplary block configuration of station 41 will be described. Station 41 includes power supplier 51, controller 52, memory 53, display apparatus 54, input apparatus 55, external communication IF 56, payment reader 57, and communication apparatus 12 described in Embodiment 1. Note that IF is an abbreviation for an interface.

Power supplier 51 is connected to cable CA1. Power supplier 51 receives power from cable CA1, converts the power into a predetermined voltage, and supplies the power to each component of station 41.

Controller 52 controls the entire station 41. Controller 52 is, for example, a CPU. Controller 52 implements predetermined functions based on programs and data stored in memory 53.

Display apparatus 54 displays an image under the control of controller 52. Input apparatus 55 receives a user's operation and outputs a signal corresponding to the user's operation to controller 52. Note that display apparatus 54 and input apparatus 55 may be integrated such as a touchscreen.

External communication IF 56 communicates with server 45 via base station 44 and network 46.

Payment reader 57 reads information of a smartphone, a credit card, or a traffic IC card, and outputs the information to controller 52. Controller 52 transmits the information read by payment reader 57 to server 45. Note that IC is an abbreviation for an integrated circuit.

Note that server 45 communicates with controller 52 of station 41 and manages user information of a user of e-scooter 43, the usage time of e-scooter 43, and the like. Server 45 performs payment processing according to the usage time of e-scooter 43 based on the information read by payment reader 57 transmitted from controller 52, the user information managed by server 45, the usage time of e-scooter 43 managed by server 45, and the like.

Communication apparatus 12 of station 41 is connected to cable CA1. Communication apparatus 12 performs PLC with communication apparatuses 11 of chargers 50 via cable CA1. In addition, communication apparatus 12 performs PLC with communication apparatuses 13 of e-scooters 43 via communication apparatuses 11 of chargers 50.

An exemplary block configuration of charger 50 of stand 42 will be described. Charger 50 includes controller 61, memory 62, radio power supply apparatus 63, and communication apparatus 11 described in Embodiment 1.

Controller 61 controls the entire charger 50. Controller 61 is, for example, a CPU. Controller 61 implements predetermined functions based on programs and data stored in memory 62.

Radio power supply apparatus 63 is connected to cable CA1. Radio power supply apparatus 63 transmits power by radio to e-scooter 43 propped up on platform 50a of stand 42.

Radio power supply apparatus 63 may include, for example, power source 32a-2, inverter 32a-3, and coil 32a-4 described in FIG. 6. Note that power source 32a-2 of radio power supply apparatus 63 is supplied with power from cable CA1.

Communication apparatus 11 is connected to cable CA1 via coupler 22 (see, for example, coupler 22a in FIG. 2, coupler 22b in FIG. 3, or coupler 22 in FIG. 6). Communication apparatus 11 performs PLC with communication apparatus 12 of station 41 via cable CA1. Communication apparatus 11 also performs PLC with communication apparatus 13 of e-scooter 43 via antenna 23 (see, for example, antenna 23 in FIG. 2, 3, or 6).

An exemplary block configuration of e-scooter 43 will be described. E-scooter 43 includes controller 71, memory 72, radio power receiving apparatus 73, battery 75, motor 76, and communication apparatus 13 described in Embodiment 1.

Controller 71 controls the entire e-scooter 43. Controller 71 is, for example, a CPU. Controller 71 implements predetermined functions based on programs and data stored in memory 72.

Radio power receiving apparatus 73 receives power transmitted from charger 50 of stand 42. Radio power receiving apparatus 73 charges battery 75 with the received power. Note that radio power receiving apparatus 73 may include, for example, coil 33a-2 and bridge rectifier circuit 33a-3 described in FIG. 6.

Motor 76 rotates based on the power of battery 75. E-scooter 43 travels by the rotation of motor 76.

Authentication processing and charging of e-scooter 43 will be described. Mobility charging system 40 performs authentication processing in server 45 to prevent, for example, an e-scooter other than e-scooter 43 provided in the rental service from being freely charged at stand 42. That is, when e-scooter 43 is propped up on stand 42, mobility charging system 40 performs the authentication processing for e-scooter 43 and starts charging.

Figure 12:
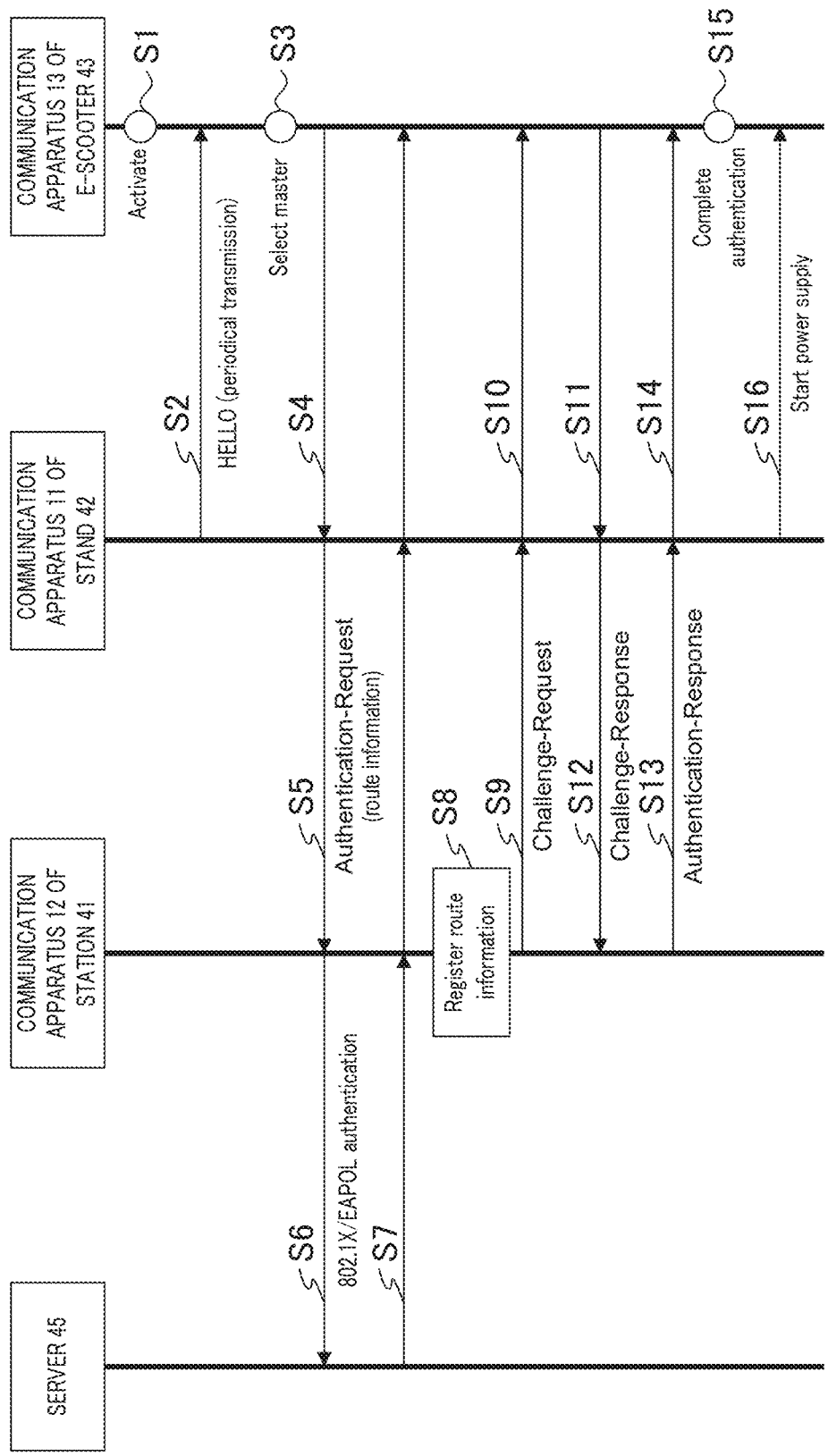
FIG. 12 is a sequence diagram describing exemplary authentication processing in the mobility charging system.

FIG. 12 is a sequence diagram describing exemplary authentication processing of mobility charging system 40. Server 45 and communication apparatus 13 of e-scooter 43 hold a certificate issued by a certificate authority.

Communication apparatus 13 of e-scooter 43 is activated (S1), for example, according to a user's operation.

Communication apparatus 11 of stand 42 receives a hello packet periodically transmitted from communication apparatus 12 of station 41, which is a master, and periodically transmits the hello packet (S2). Note that the hello packet may be referred to as a hello message or a hello signal.

When e-scooter 43 is propped up in the prop-up position of stand 42, antenna 23 of communication apparatus 11 of stand 42 and antenna 13c of communication apparatus 13 of e-scooter 43 are close enough to enable communication between communication apparatus 11 and communication apparatus 13. That is, when e-scooter 43 is propped up in the prop-up position of stand 42, communication apparatus 13 of e-scooter 43 receives a hello packet transmitted from communication apparatus 11 of stand 42.

Communication apparatus 13 of e-scooter 43 selects a master communication apparatus based on the hello packet received in S2 (S3). Here, communication apparatus 13 of e-scooter 43 selects communication apparatus 12 of station 41.

After selecting a master in S3, communication apparatus 13 of e-scooter 43 transmits an authentication request to communication apparatus 12 of station 41, which is the master, via communication apparatus 11 of stand 42 (S4 and S5). Note that the authentication request includes route information between communication apparatus 13 of e-scooter 43 and communication apparatus 12 of station 41.

Upon receiving the authentication request transmitted in S4 and S5, communication apparatus 12 of station 41 transmits the authentication request to server 45 in accordance with the IEEE802.1X authentication protocol (S6).

Upon receiving the authentication request transmitted in S6, server 45 transmits an authentication result to communication apparatus 13 of e-scooter 43 via communication apparatus 12 of station 41 (S7). Here, the authentication is considered successful when the certificates held by server 45 and communication apparatus 13 of e-scooter 43 are mutually verified as correct. Server 45 transmits an authentication result indicating the successful authentication to communication apparatus 13 of e-scooter 43 via communication apparatus 12 of station 41. When the authentication is successful, the authentication result includes a pairwise master key (PMK).

Upon receiving the authentication result of the successful authentication, communication apparatus 12 of station 41 registers the route information included in the authentication request transmitted in S4 and S5 in a storage apparatus (S8).

After registering the route information in S8, communication apparatus 12 of station 41 transmits a challenge request to communication apparatus 13 of e-scooter 43 via communication apparatus 11 of stand 42 based on the registered route information (S9 and S10). Communication apparatus 12 of station 41 generates a pairwise key (PWK) using the PMK.

Communication apparatus 13 of e-scooter 43 transmits a challenge response to communication apparatus 12 of station 41 in response to the reception of the challenge request transmitted in S9 and S10 (S11 and S12). Note that communication apparatus 13 of e-scooter 43 generates a PWK using the PMK included in the IEEE802.1X authentication result, and encrypts the challenge response.

Communication apparatus 12 of station 41 decodes the challenge response transmitted in S11 and S12 using the PWK. When the challenge response transmitted in S11 and S12 can be decoded, communication apparatus 12 of station 41 transmits an authentication response to communication apparatus 13 of e-scooter 43 via communication apparatus 11 of stand 42 (S13 and S14).

Communication apparatus 13 of e-scooter 43 recognizes completion of the authentication (successful authentication) based on the authentication response transmitted in S13 and S14 (S15).

Communication apparatus 11 of stand 42 starts power supply (charging) to e-scooter 43 based on the authentication response transmitted in S13 and S14 (S16).

Multi-hop in communication apparatus 11 of charger 50 will be described. The further charger 50 of stand 42 is from station 41, the more degraded a PLC signal transmitted from communication apparatus 12 of station 41 to communication apparatus 13 of e-scooter 43. In addition, the further charger 50 of stand 42 is from station 41, the more degraded a PLC signal transmitted from communication apparatus 13 of e-scooter 43 to communication apparatus 12 of station 41.

In this regard, communication apparatus 11 of charger 50 performs relay processing (retransmission processing) on a PLC signal according to the PLC protocol. For example, communication apparatus 11 of charger 50 performs the relay processing on a PLC signal based on the signal strength of the PLC signal.

Figure 13:
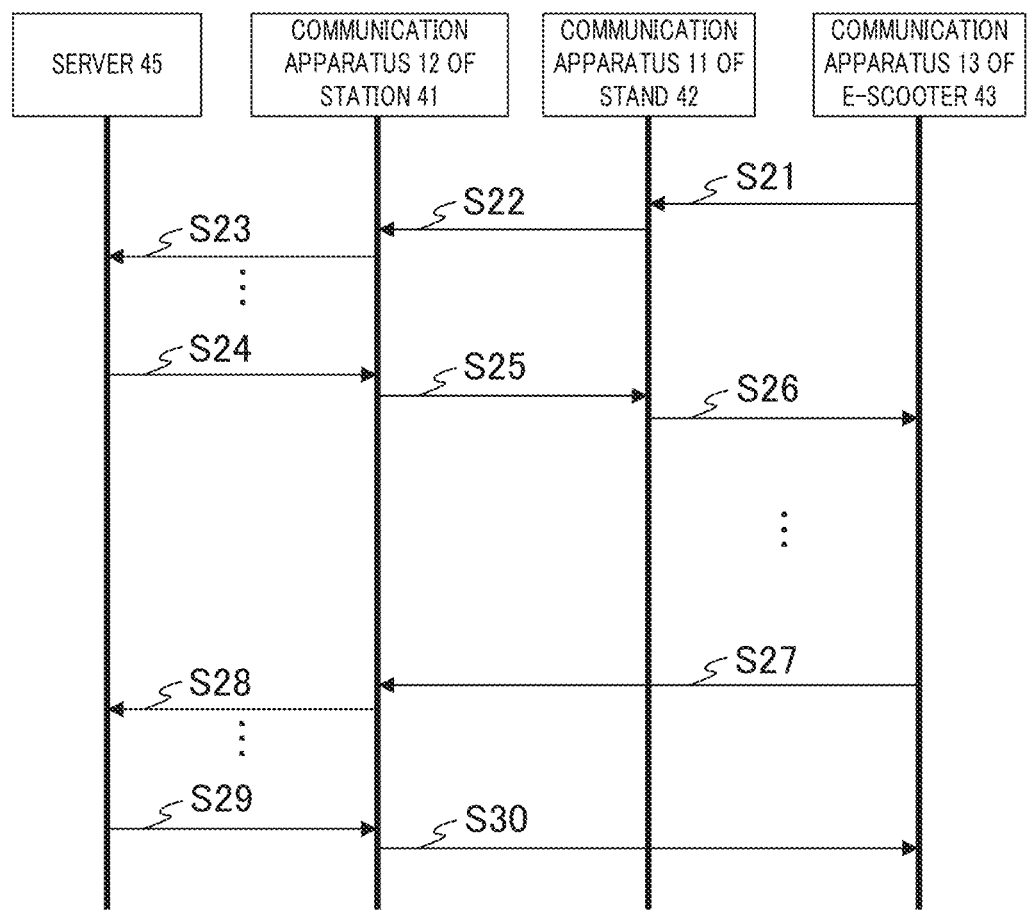
FIG. 13 is a sequence diagram describing exemplary relay processing for a PLC signal.

FIG. 13 is a sequence diagram for describing exemplary relay processing for a PLC signal. It is assumed that controller 71 of e-scooter 43 transmits a data signal to server 45.

Communication apparatus 13 of e-scooter 43 converts a data signal to be transmitted to server 45 into a PLC signal, and transmits the PLC signal to communication apparatus 11 of stand 42 (charger 50) via antenna 13c of communication apparatus 13 (S21).

Communication apparatus 11 of stand 42 receives the PLC signal transmitted in S21 via antenna 23 of communication apparatus 11. Communication apparatus 11 of stand 42 determines whether to perform relay processing on the received PLC signal in accordance with the PLC protocol. Here, communication apparatus 11 of stand 42 determines to perform the relay processing.

Communication apparatus 11 of stand 42 transmits the PLC signal subjected to the relay processing (re-modulation) to communication apparatus 12 of station 41 via cable CA1 (S22).

Communication apparatus 12 of station 41 receives the PLC signal transmitted in S22. Communication apparatus 12 of station 41 outputs a data signal based on the received PLC signal to controller 52. Controller 52 of station 41 transmits the data signal outputted from communication apparatus 12 to server 45 via base station 44 and network 46 (S23).

In this manner, the PLC signal of communication apparatus 13 of e-scooter 43 is processed and relayed by communication apparatus 11 of stand 42, and transmitted to communication apparatus 12 of station 41.

It is assumed that server 45 transmits a data signal to e-scooter 43. Server 45 transmits a data signal to station 41 via network 46 and base station 44 (S24).

Controller 52 of station 41 receives the data signal transmitted in S24. Controller 52 of station 41 outputs the received data signal to communication apparatus 12. Communication apparatus 12 of station 41 converts the data signal outputted from controller 52 into a PLC signal, and transmits the PLC signal to communication apparatus 11 of stand 42 via cable CA1 (S25).

Communication apparatus 11 of stand 42 determines whether to perform relay processing on the PLC signal transmitted in S25 in accordance with the PLC protocol. Here, communication apparatus 11 of stand 42 determines to perform the relay processing.

Communication apparatus 11 of stand 42 transmits the PLC signal subjected to the relay processing (re-modulation) to communication apparatus 13 of e-scooter 43 via antenna 23 of communication apparatus 11 (S26).

In this manner, the PLC signal of communication apparatus 12 of station 41 is processed and relayed by communication apparatus 11 of stand 42, and transmitted to communication apparatus 13 of e-scooter 43.

It is assumed that controller 71 of e-scooter 43 transmits a data signal to server 45. Communication apparatus 13 of e-scooter 43 converts a data signal to be transmitted to server 45 into a PLC signal, and transmits the PLC signal to communication apparatus 11 of stand 42 via antenna 13c of communication apparatus 13 (S27).

Communication apparatus 11 of stand 42 receives the PLC signal transmitted in S27 via antenna 23 of communication apparatus 11. Communication apparatus 11 of stand 42 determines whether to perform relay processing on the received PLC signal in accordance with the PLC protocol. Here, communication apparatus 11 of stand 42 determines not to perform the relay processing. Thus, the PLC signal received by antenna 23 of communication apparatus 11 is not subjected to relay processing by PLC 21 of communication apparatus 11, and is outputted to cable CA1 without through communication apparatus 11. That is, the PLC signal transmitted from communication apparatus 13 of e-scooter 43 is transmitted to communication apparatus 12 of station 41 directly.

Communication apparatus 12 of station 41 receives the PLC signal transmitted in S27. Communication apparatus 12 of station 41 outputs a data signal based on the received PLC signal to controller 52. Controller 52 of station 41 transmits the data signal outputted from communication apparatus 12 to server 45 via base station 44 and network 46 (S28).

In this manner, the PLC signal of communication apparatus 13 of e-scooter 43 is transmitted to communication apparatus 12 of station 41 without the relay processing by communication apparatus 11 of stand 42.

It is assumed that server 45 transmits a data signal to e-scooter 43. Server 45 transmits a data signal to station 41 via network 46 and base station 44 (S29).

Controller 52 of station 41 receives the data signal transmitted in S29. Controller 52 of station 41 outputs the received data signal to communication apparatus 12. Communication apparatus 12 of station 41 converts the data signal outputted from controller 52 into a PLC signal, and transmits the PLC signal to communication apparatus 11 of stand 42 via cable CA1 (S30).

Communication apparatus 11 of stand 42 receives the PLC signal transmitted from communication apparatus 12 of station 41. Communication apparatus 11 of stand 42 determines whether to perform relay processing on the received PLC signal in accordance with the PLC protocol. Here, communication apparatus 11 of stand 42 determines not to perform the relay processing. Thus, the PLC signal received by communication apparatus 11 is not subjected to relay processing by PLC 21 of communication apparatus 11, and is outputted to antenna 23 of communication apparatus 11 without through communication apparatus 11. That is, the PLC signal transmitted from communication apparatus 12 of station 41 is transmitted to communication apparatus 13 of e-scooter 43 directly.

In this manner, the PLC signal of communication apparatus 12 of station 41 is transmitted to communication apparatus 13 of e-scooter 43 without the relay processing by communication apparatus 11 of stand 42.

Figure 14:
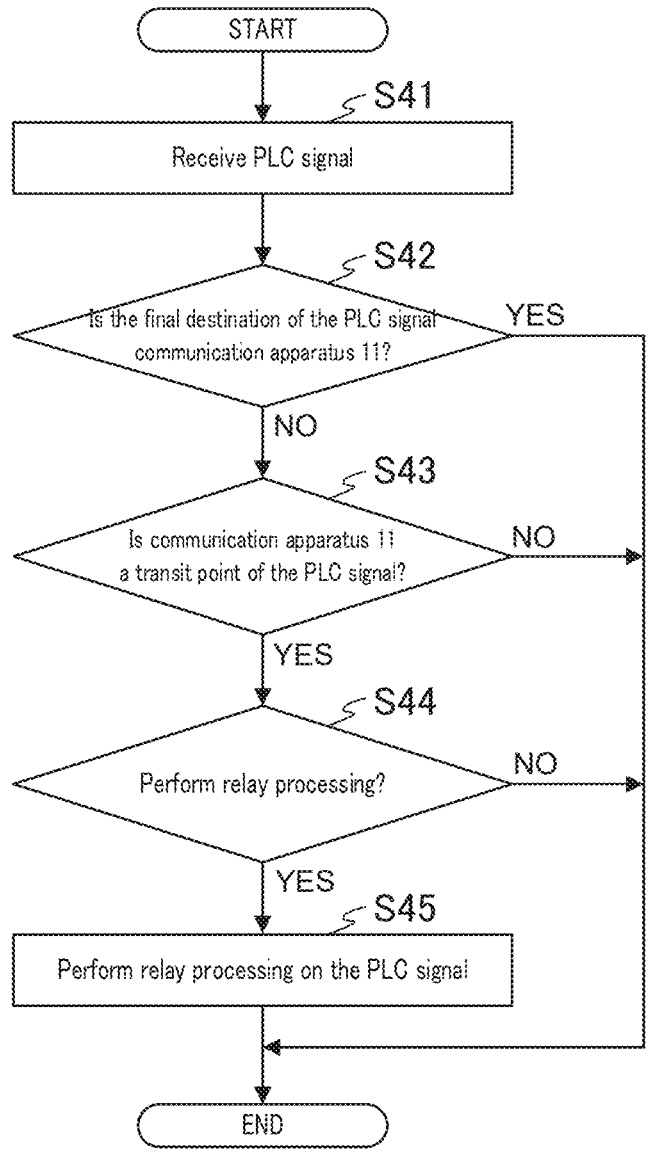
FIG. 14 is a flowchart describing exemplary relay processing in a communication apparatus of a stand.

FIG. 14 is a flowchart describing exemplary relay processing in communication apparatus 11 of stand 42. Communication apparatus 11 of stand 42 receives a PLC transmitted from communication apparatus 12 of station 41 or communication apparatus 13 of e-scooter 43 (S41).

Communication apparatus 11 of stand 42 determines whether the final destination of the PLC signal received in S41 is communication apparatus 11 (S42).

When determining that the final destination of the PLC signal received in S41 is communication apparatus 11 ("YES" in S42), communication apparatus 11 of stand 42 terminates the processing of the flow chart.

Meanwhile, when determining that the final destination of the PLC signal received in S41 is not communication apparatus 11 ("NO" in S42), communication apparatus 11 of stand 42 determines whether communication apparatus 11 is a transit point (relay apparatus) of the PLC signal received in S41 (S43).

When determining that communication apparatus 11 is not a transit point of the PLC signal ("NO" in S43), communication apparatus 11 of stand 42 terminates the processing of the flow chart.

Meanwhile, when determining that communication apparatus 11 is a transit point of the PLC signal ("YES" in S43), communication apparatus 11 of stand 42 performs relay processing on the PLC signal received in S41 in accordance with the PLC protocol (S44). Whether to relay is regularly learned in advance before performing communication. In terms of the determination of whether to relay, in a case where communication apparatus 11 of stand 42 determines at the time of learning that relaying enables data to be transmitted to communication apparatus 12 in a shorter time, for example, it determines to perform relay processing on the PLC signal received in S41. The indicator for the determination includes a PHY rate required between the communication apparatuses.

When determining not to perform the relay processing on the PLC signal received in S41 ("NO" in S44), communication apparatus 11 of stand 42 terminates the processing of the flow chart.

Meanwhile, when determining to perform the relay processing on the PLC signal received in S41 ("YES" in S44), communication apparatus 11 of stand 42 performs relay processing on the PLC signal received in S41 (S45). For example, communication apparatus 11 of stand 42 re-modulates and transmits the PLC signal received in S41.

Other exemplary block configurations of station 41, stand 42, and e-scooter 43 will be described.

Figure 15:
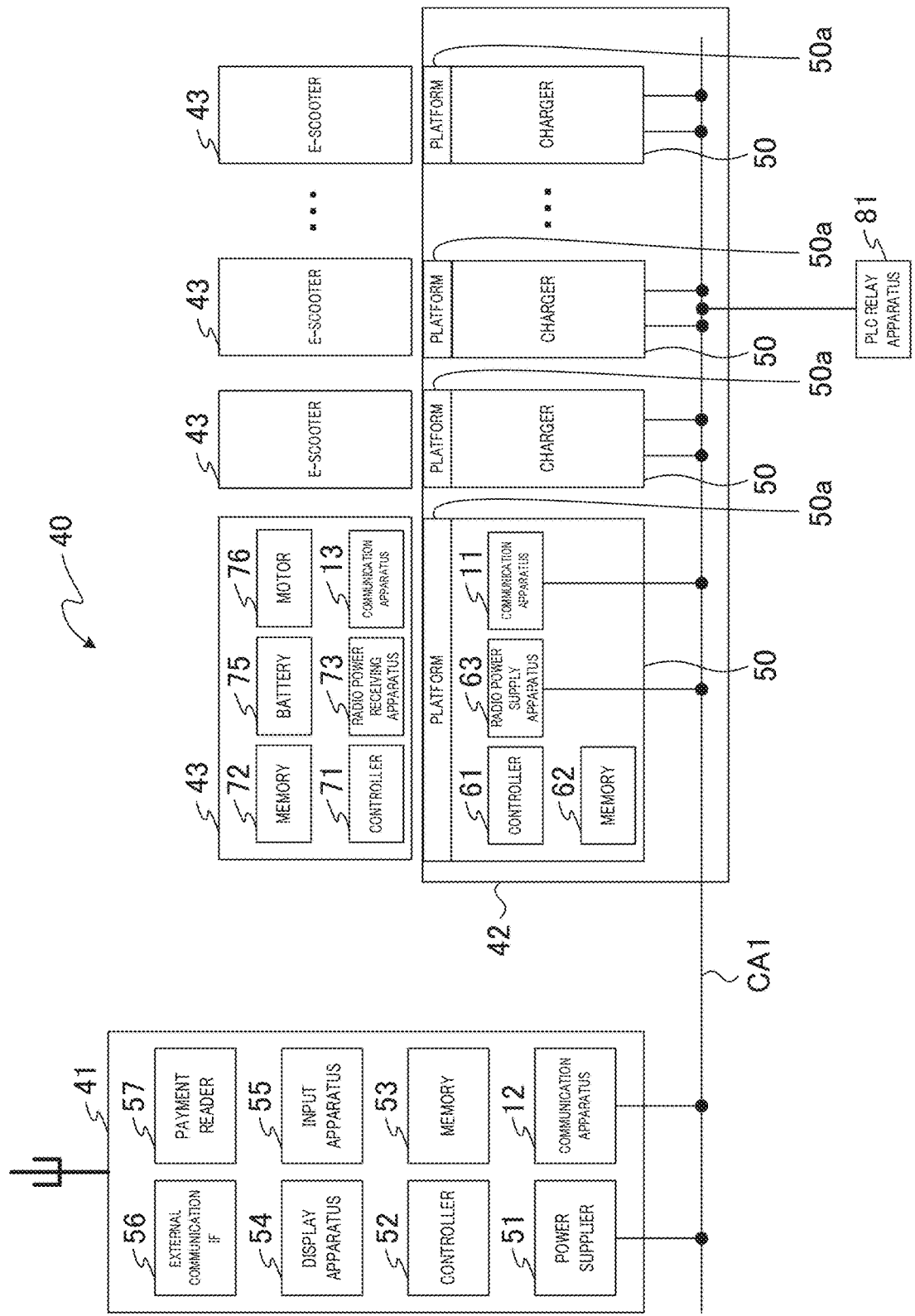
FIG. 15 illustrates another exemplary block configuration of the mobility charging system.

FIG. 15 illustrates another exemplary block configuration of mobility charging system 40. FIG. 15 illustrates exemplary configurations of station 41, stand 42, and e-scooter 43. In FIG. 15, the same components as those in FIG. 11 are denoted by the same reference signs. In the following, the difference from FIG. 11 will be described.

As illustrated in FIG. 15, PLC relay apparatus 81 is connected to cable CA1. PLC relay apparatus 81 relays a PLC signal flowing through cable CA1. For example, PLC relay apparatus 81 receives a signal transmitted from communication apparatus 12 of station 41 to communication apparatus 11 of stand 42 or communication apparatus 13 of e-scooter 43, re-modulates the signal, and outputs the signal to cable CA1. In addition, PLC relay apparatus 81 receives a signal transmitted from communication apparatus 11 of stand 42 or communication apparatus 13 of e-scooter 43 to communication apparatus 12 of station 41, re-modulates the signal, and outputs the signal to cable CA1. As described above, PLC relay apparatus 81 that relays a PLC signal may be connected to cable CA1.

The position where PLC relay apparatus 81 is connected to cable CA1 is not particularly limited, and for example, PLC relay apparatus 81 is connected to cable CA1 between charger 50 placed closer to station 41 (left side) and charger 50 placed further from station 41 (right side), as illustrated in FIG. 15.

Figure 16:
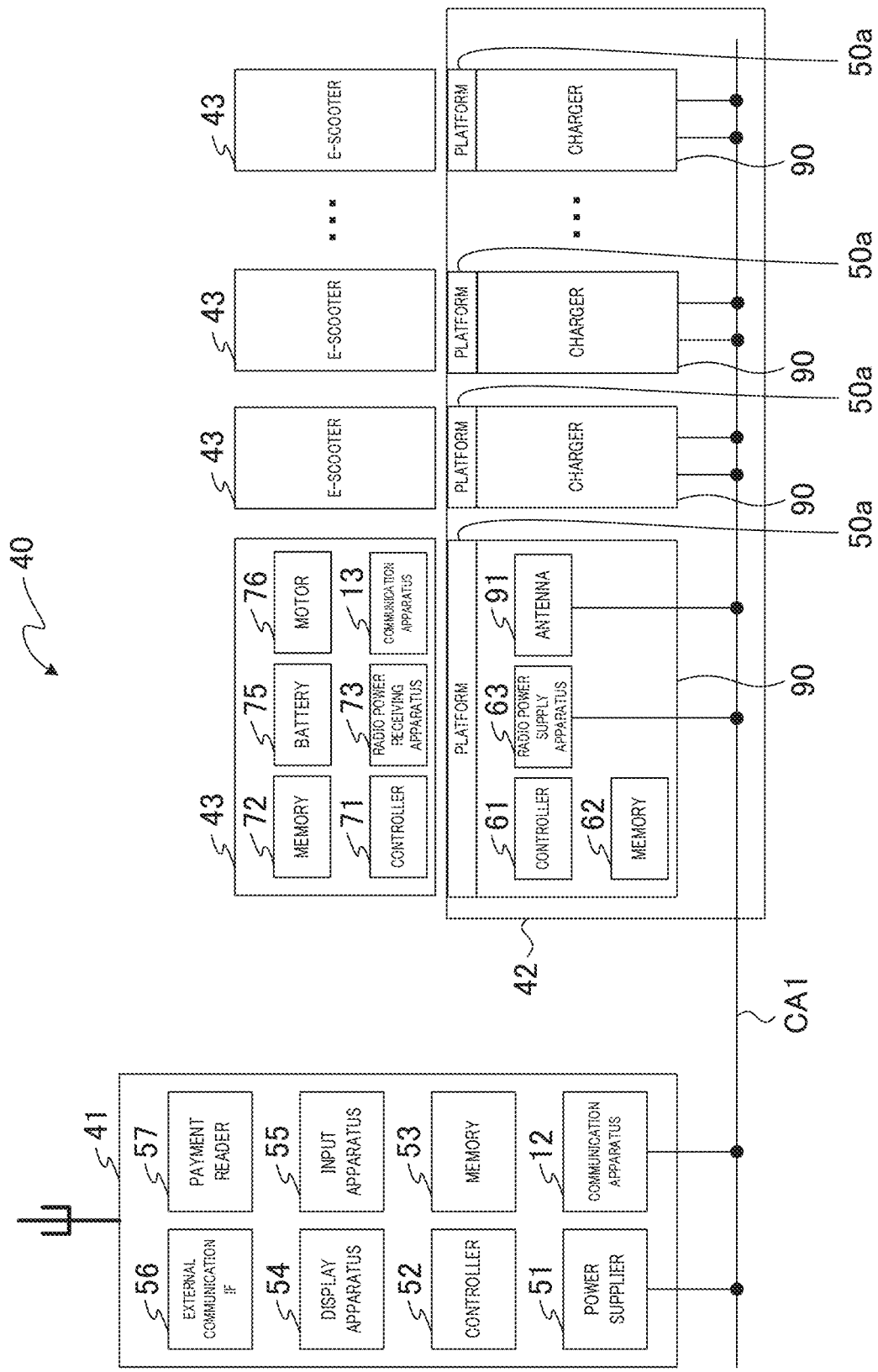
FIG. 16 illustrates still another exemplary block configuration of the mobility charging system.

FIG. 16 illustrates still another exemplary block configuration of mobility charging system 40. FIG. 16 illustrates exemplary block configurations of station 41, stand 42, and e-scooters 43. In FIG. 16, the same components as those in FIG. 11 are denoted by the same reference signs. In the following, the difference from FIG. 11 will be described.

As illustrated in FIG. 16, chargers 90 are connected to cable CA1. Charger 90 includes antenna 91. Antenna 91 is composed of a coil. Antenna 91 is connected to cable CA1. Note that antenna 91 may be connected to cable CA1 via coupler 22.

As illustrated in FIG. 16, charger 90 need not include a PLC. In this case, charger 90 illustrated in FIG. 16 is unable to communicate with station 41 and e-scooter 43. Note that station 41 and e-scooter 43 can communicate with each other via antenna 91 of charger 90.

In mobility charging system 40 based on the exemplary block configuration illustrated in FIG. 16, each of chargers 90 includes no communication apparatus 11, and it is thus difficult for station 41 to indicate the completion of authentication of e-scooter 43 to each charger 90, but charging of e-scooter 43 does not necessarily start based on the authentication processing described above. That is, e-scooter 43 can be charged simply by being propped up on stand 42 without the authentication processing by station 41 and e-scooter 43 before the start of charging nor registration of scooter information in server 45. Such a system is useful in, for example, mobility charging system 40 based on the exemplary block configuration illustrated in FIG. 16, in which it is difficult for station 41 to indicate the completion of authentication of e-scooter 43 to each charger 90 since each charger 90 includes no communication apparatus 11. For example, the system is installed in a location where e-scooter users are limited and the limited users can freely use e-scooters, such as a factory site.

Even in the system without the authentication processing, e-scooter 43 may transmit a data signal stored in e-scooter 43 to server 45. Note that the data signal here is, for example, ID information of e-scooter 43, the remaining battery level, travel information (travel distance), GPS information, and the like.

Further, stand 42 may include both charger 50 and charger 90. For example, charger 90 may be located closer to station 41 (left side) and charger 50 may be located further from station 41 (right side).

As described above, station 41 of mobility charging system 40 includes communication apparatus 12 described in Embodiment 1, charger 50 includes communication apparatus 11 described in Embodiment 1, and e-scooter 43 includes communication apparatus 13 described in Embodiment 1. Station 41 communicates with e-scooter 43 via cable CA1, coupler 22, and antenna 23 to perform authentication processing for e-scooter 43. Since charger 50 and e-scooter 43 perform short-range radio communication based on PLC communication via antenna 13 (coil) as described above, it is possible to shorten the propagation distance of a signal radiated from antenna 13 and to prevent interference of radio communication. This allows station 41 to appropriately perform the authentication processing. Further, since charger 50 includes communication apparatus 11 described in Embodiment 1, the circuit size of charger 50 is reduced, thereby reducing the circuit size and cost of mobility charging system 40.

Note that, although server 45 performs the authentication processing for e-scooter 43 in the above description, communication apparatus 12 of station 41 may perform the authentication processing for e-scooter 43.

In addition, charger 50 illustrated in FIG. 11 may be connected to cable CA1 in FIG. 16. That is, both of charger 50 illustrated in FIG. 11 and charger 90 illustrated in FIG. 16 may be connected to cable CA1.

Further, a charging target of mobility charging system 40 is not limited to e-scooter 43. The charging target of mobility charging system 40 may be, for example, an electric bicycle.

Embodiment 4

In Embodiment 4, a signal band for a PLC signal is different between adjacent chargers.

Figure 17:
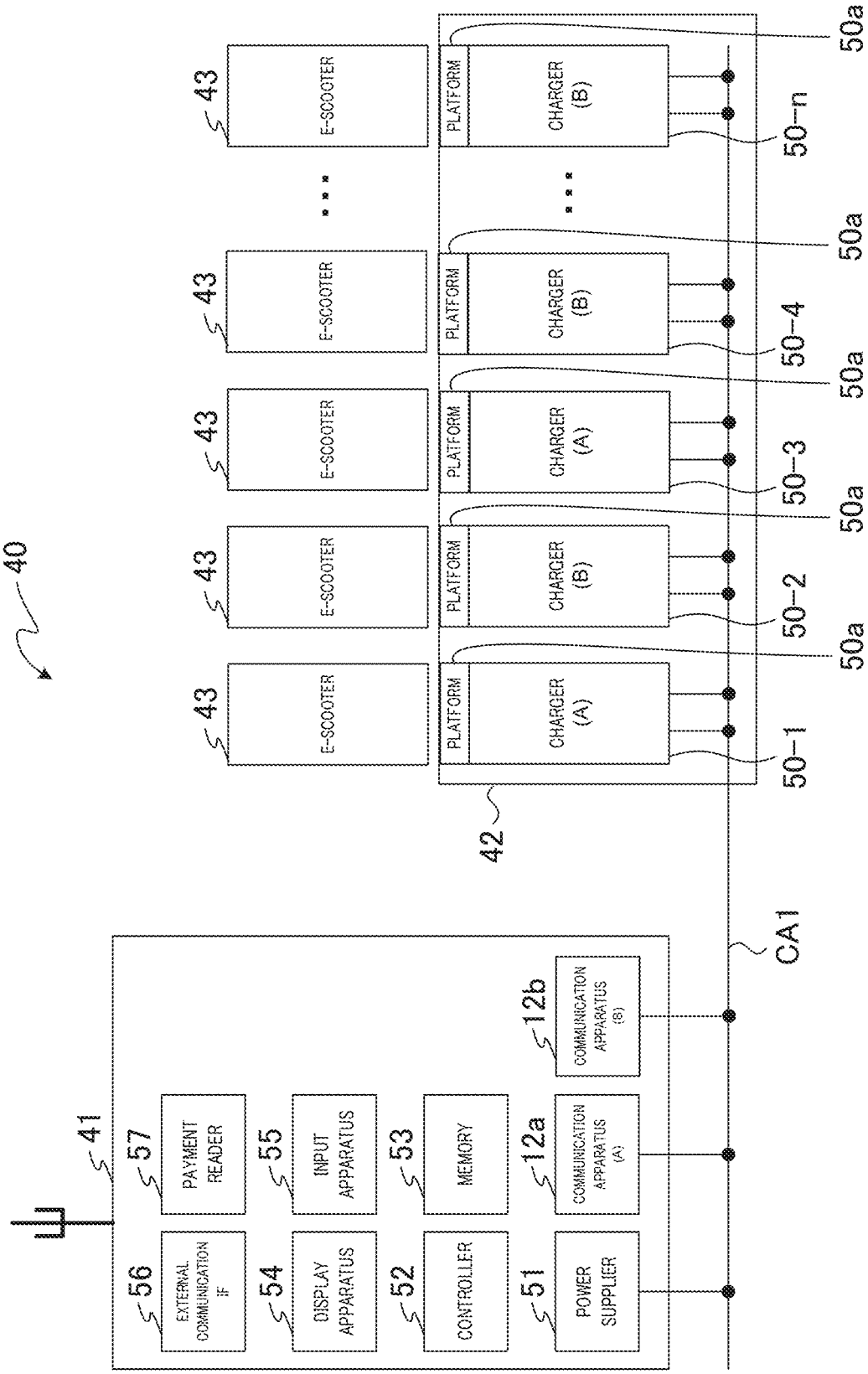
FIG. 17 illustrates an exemplary configuration of the mobility charging system according to Embodiment 4.

FIG. 17 illustrates an exemplary configuration of mobility charging system 40 according to Embodiment 4. FIG. 17 illustrates exemplary block configurations of station 41, stand 42, and e-scooters 43. In FIG. 17, the same components as those in FIG. 11 are denoted by the same reference signs. In the following, the difference from FIG. 11 will be described.

As illustrated in FIG. 17, station 41 includes communication apparatuses 12a and 12b. Communication apparatus 12a performs PLC in signal band A, for example. Communication apparatus 12b performs PLC in signal band B, for example.

Chargers 50-1, 50-2, 50-3, 50-4, . . . , 50-n of stand 42 each include communication apparatus 11 as is the case with charger 50 illustrated in FIG. 11. Note that adjacent communication apparatuses 11 of chargers 50-1, 50-2, 50-3, 50-4, . . . , 50-n perform PLC in different signal bands.

For example, communication apparatuses 11 of chargers 50-1, 50-3, . . . , 50-k, where k is an odd number, perform PLC in signal band A. Accordingly, communication apparatuses 11 of chargers 50-1, 50-3, . . . , 50-k perform PLC with communication apparatus 12a of station 41.

In addition, communication apparatuses 11 of chargers 50-2, 50-4, . . . , 50-1, where 1 is an even number, perform PLC in signal band B. Accordingly, communication apparatuses 11 of chargers 50-2, 50-4, . . . , 50-1 perform PLC with communication apparatus 12b of station 41.

Note that e-scooter 43 may be propped up on stand 42 in a position corresponding to any of chargers 50-1, 50-3, . . . , 50-k using signal band A, or may be propped up on stand 42 in a position corresponding to any of chargers 50-2, 50-4, . . . , 50-1 using signal band B. Thus, communication apparatus 13 of e-scooter 43 has a function of performing PLC in a plurality of signal bands, which will be described later.

In the following, communication apparatuses 12a and 12b of station 41 are collectively referred to as communication apparatus(es) 12 unless they are distinguished from each other. Chargers 50-1, 50-2, 50-3, 50-4, . . . , 50-n are collectively referred to as charger(s) 50 unless they are distinguished from each other.

Figure 18A:
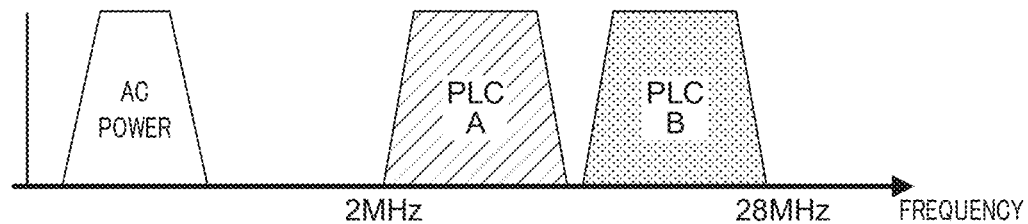
FIG. 18A illustrates exemplary signal bands for PLC.
Figure 18B:
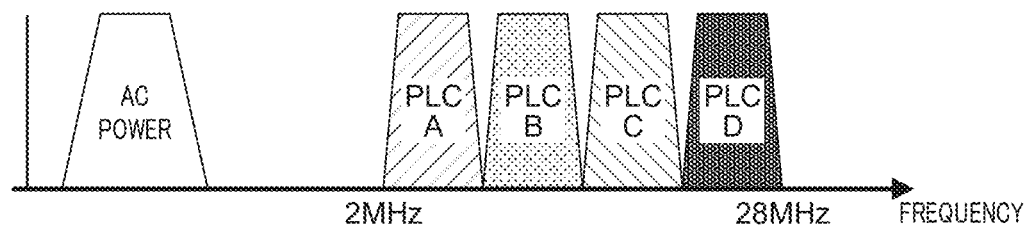
FIG. 18B illustrates other exemplary signal bands for PLC.
Figure 18C:
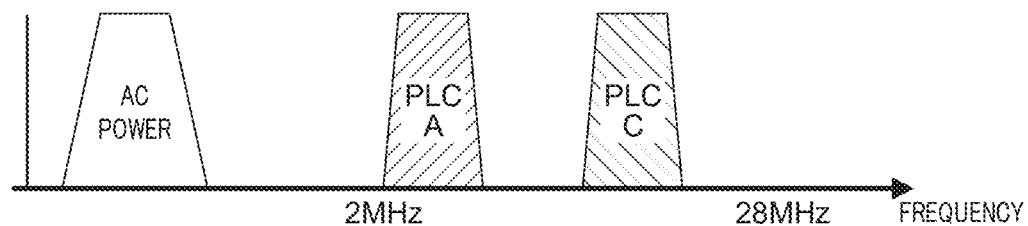
FIG. 18C illustrates still other exemplary signal bands for PLC.

FIGS. 18A to 18C illustrate exemplary signal bands for PLC. FIGS. 18A to 18C also illustrate the frequency band of AC power and the frequency band of DC power in addition to the exemplary PLC signal bands.

As illustrated in FIG. 18A, mobility charging system 40 may perform PLC using two signal bands A and B. As described in FIG. 17, station 41 may include two communication apparatuses 12, and first communication apparatus 12 may perform PLC in signal band A. Second communication apparatus 12 may perform PLC in signal band B. As also described in FIG. 17, communication apparatuses 11 of adjacent chargers 50 may perform PLC using different signal bands A and B respectively.

As illustrated in FIG. 18B, mobility charging system 40 may perform PLC using three or more different signal bands. For example, mobility charging system 40 may perform PLC using four signal bands as illustrated in FIG. 18B.

In the case of FIG. 18B, station 41 includes four communication apparatuses 12. First communication apparatus 12 performs PLC in signal band A. Second communication apparatus 12 performs PLC in signal band B. Third communication apparatus 12 performs PLC in signal band C. Fourth communication apparatus 12 performs PLC in signal band D.

In the case of FIG. 18B, communication apparatus 11 of charger 50-1 of stand 42 performs PLC in signal band A, for example. Communication apparatus 11 of charger 50-2 of stand 42 performs PLC in signal band B, for example. Communication apparatus 11 of charger 50-3 of stand 42 performs PLC in signal band C, for example. Communication apparatus 11 of charger 50-4 of stand 42 performs PLC in signal band D, for example. Similarly, the four signal bands are sequentially allocated to communication apparatuses 11 of chargers 50 of stand 42, and communication apparatuses 11 perform PLC in the allocated signal bands.

As illustrated in FIG. 18C, mobility charging system 40 may perform PLC using distant signal bands. For example, mobility charging system 40 may divide a signal band of 2 MH to 28 MHz (both inclusive) into a plurality of signal bands, and perform PLC using signal bands that are not adjacent to each other among the plurality of divided signal bands. To be more specific, as illustrated in FIG. 18C, mobility charging system 40 may perform PLC using signal bands A and C among four signal bands A to D illustrated in FIG. 18B.

Mobility charging system 40 can reduce interference of PLC signals when distant signal bands are used. This also facilitates a filtering process of PLC signals in mobility charging system 40, thereby simplifying or reducing the size of TX filter 21c and RX filter 21f illustrated in FIG. 2 or simplifying the configuration of a digital filter process performed in AFE 21b, for example.

Communication apparatus 13 of e-scooter 43 will be described. As described above, e-scooter 43 may be propped up on stand 42 in a position corresponding to charger 50 using signal band A, or may be propped up on stand 42 in a position corresponding to charger 50 using signal band B. Thus, communication apparatus 13 of e-scooter 43 has a function of performing PLC in a plurality of signal bands, and determines (selects) a signal band (channel) to be used for PLC.

Note that, when communication apparatus 12 of station 41 and communication apparatus 13 of e-scooter 43 perform PLC, communication apparatus 11 of charger 50 performs relay processing. Thus, communication apparatus 13 of e-scooter 43 communicates with communication apparatus 12 of station 41 in the signal band of communication apparatus 11 of charger 50 corresponding to the position of stand 42 where e-scooter 43 is propped up.

For example, charger 50-1 in FIG. 17 performs PLC in signal band A. Accordingly, communication apparatus 13 of e-scooter 43 propped up in the position corresponding to charger 50-1 in FIG. 17 performs PLC with communication apparatus 12a of station 41 in signal band A. Further, for example, charger 50-2 in FIG. 17 performs PLC in signal band B. Accordingly, communication apparatus 13 of e-scooter 43 propped up in the position corresponding to charger 50-2 in FIG. 17 performs PLC with communication apparatus 12b of station 41 in signal band B.

Figure 19:
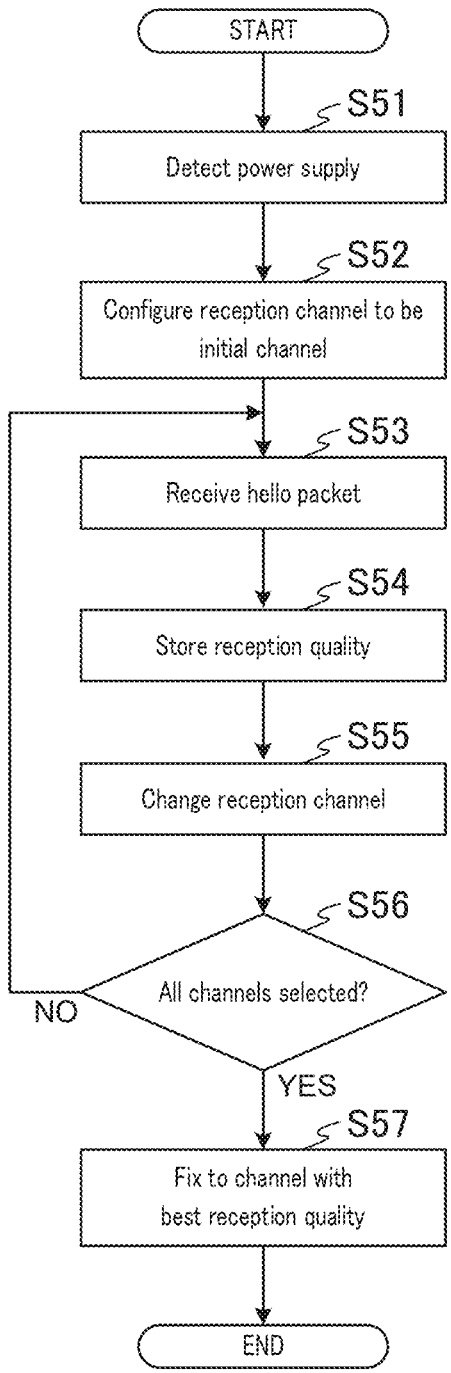
FIG. 19 is a flowchart describing an exemplary channel configuration operation by a communication apparatus of an e-scooter.

FIG. 19 is a flowchart describing an exemplary channel configuration operation by communication apparatus 13 of e-scooter 43. Communication apparatus 13 of e-scooter 43 detects power supply from cable CA1 (S51). For example, communication apparatus 13 of e-scooter 43 detects power supply from cable CA1 based on the voltage outputted from DC/DC 21n or AC/DC 21o.

When detecting power supply from cable CA1, communication apparatus 13 of e-scooter 43 configures a PLC reception channel to be an initial channel (S52) and receives a hello packet with two or more multi-hops (S53).

Note that the hello packet includes information on the number of multi-hops. When relay processing is performed in a PLC communication apparatus, the number of multi-hops in the hello packet is incremented by one. The hello packet outputted from communication apparatus 12 of station 41 is subjected to relay processing in communication apparatus 11 of charger 50 and transmitted to communication apparatus 13 of e-scooter 43, and thus the number of multi-hops is at least two or more.

Communication apparatus 13 of e-scooter 43 stores the reception quality of the hello packet received in S53 in RAM 21h (S54). The reception quality may be, for example, CINR, the speed of a PLC PHY signal, or the power magnitude of the PLC PHY signal. Note that CINR is an abbreviation for carrier power to interference power plus noise ratio. PHY is an abbreviation for physical.

After storing the reception quality of the hello packet in RAM 21h, communication apparatus 13 of e-scooter 43 changes the PLC reception channel (S55).

Communication apparatus 13 of e-scooter 43 determines whether all PLC channels have been selected (S56).

When communication apparatus 13 of e-scooter 43 have not selected all PLC channels ("NO" in S56), the processing is back to S53. That is, communication apparatus 13 of e-scooter 43 receives a hello packet in the reception channel changed in S55.

Meanwhile, when all PLC channels have been selected ("YES" in S56), communication apparatus 13 of e-scooter 43 fixes the PLC reception channel to the channel of a hello packet with best reception quality among the reception qualities of hello packets stored in RAM 21h (S57).

As described above, mobility charging system 40 changes a signal band of a PLC signal for chargers 50 adjacent to each other. This prevents interference in radio communication between charger 50 and e-scooter 43 in mobility charging system 40. Although detection of power supply triggers the reception channel selection operation here, the detection of power supply is not necessary. Communication apparatus 13 of e-scooter 43 only needs to know that it is in a charging state at a charging stand, and thus the channel selection operation may be started, for example, after a user presses a button of the charging mode (or return button) etc.

Embodiment 5

In Embodiment 5, a case with a plurality of single-phase two-wire cables will be described.

Figure 20:
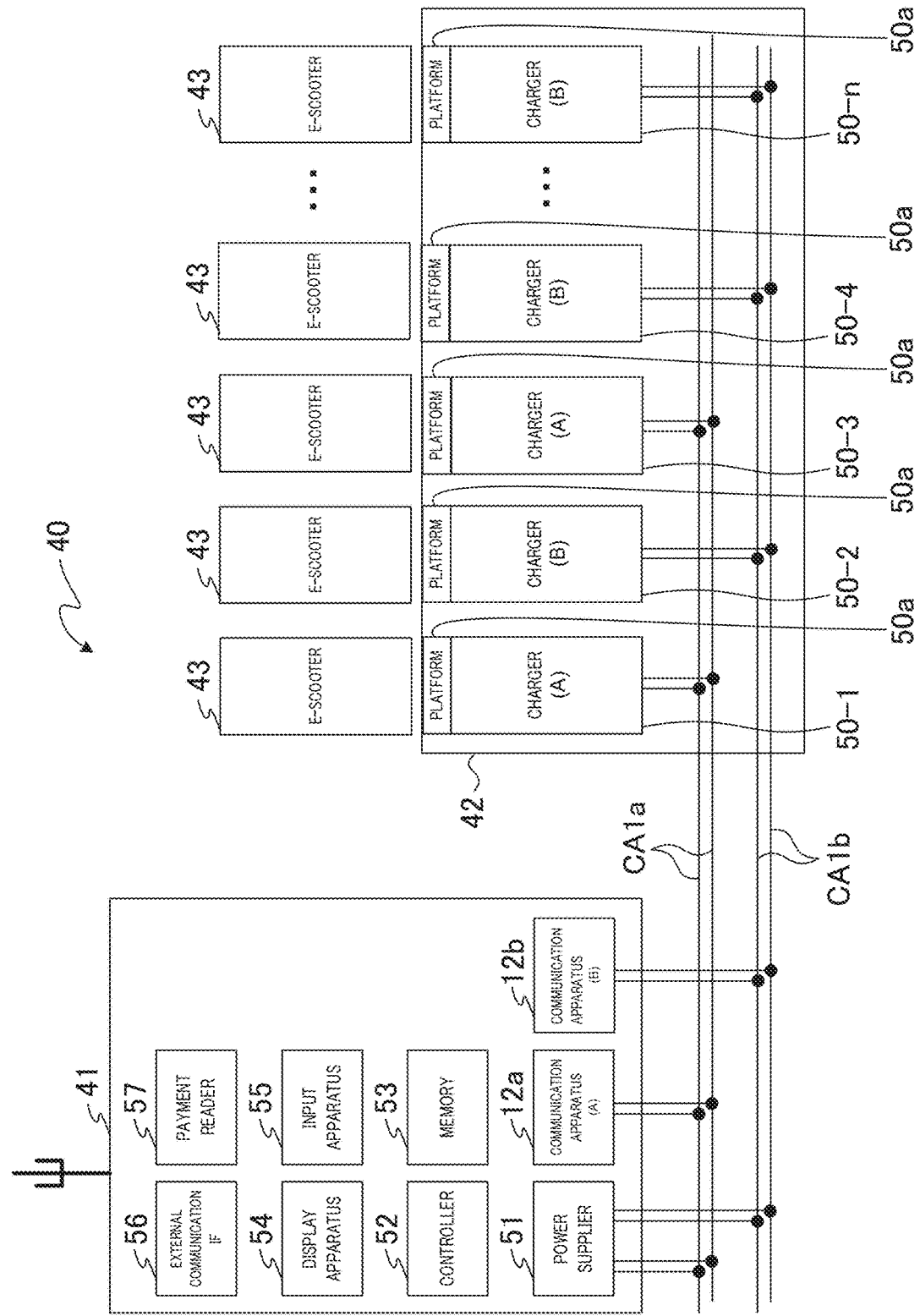
FIG. 20 illustrates an exemplary configuration of the mobility charging system according to Embodiment 5.

FIG. 20 illustrates an exemplary configuration of mobility charging system 40 according to Embodiment 5. FIG. 20 illustrates exemplary block configurations of station 41, stand 42, and e-scooters 43. In FIG. 20, the same components as those in FIG. 17 are denoted by the same reference signs. In the following, the difference from FIG. 17 will be described.

As illustrated in FIG. 20, mobility charging system 40 includes single-phase two-wire cable CA1a and single-phase two-wire cable CA1b. Power supplier 51 of communication apparatus 12 of station 41 supplies power to cables CA1a and CA1b.

In cables CA1a and CA1b, PLC is performed in different signal bands respectively. For example, PLC in signal band A is performed in cable CA1a. PLC in signal band B is performed in cable CA1b.

Thus, communication apparatus 12a of station 41 performing PLC in signal band A is connected to cable CA1a. Communication apparatus 12b of station 41 performing PLC in signal band B is connected to cable CA1b.

In addition, communication apparatuses 11 of chargers 50-1, 50-3, . . . , 50-k performing PLC in signal band A are connected to cable CA1a. Communication apparatuses 11 of chargers 50-2, 50-4, . . . , 50-1 performing PLC in signal band B are connected to cable CA1b.

As described in Embodiment 4, communication apparatus 13 of e-scooter 43 may be propped up on stand 42 in a position corresponding to charger 50 using signal band A, or may be propped up on stand 42 in a position corresponding to charger 50 using signal band B. Thus, communication apparatus 13 of e-scooter 43 illustrated in FIG. 20 has a function of performing PLC in a plurality of signal bands and determines a channel to be used for PLC, as is the case with communication apparatus 13 of e-scooter 43 in Embodiment 4.

As described above, adjacent chargers 50 in mobility charging system 40 are respectively connected to single-phase two-wire cables CA1a and CA1b in which the signal bands of PLC signals are different from each other. This prevents interference in radio communication between charger 50 and e-scooter 43 in mobility charging system 40.

Note that, although two single-phase two-wire cables have been described in the example of FIG. 20, there may be three or more cables. For example, mobility charging system 40 may include four cables. The four cables may be used for PLC in different signal bands respectively. For example, the first cable may be used for PLC in signal band A. The second cable may be used for PLC in signal band B. The third cable may be used for PLC in signal band C. The fourth cable may be used for PLC in signal band D.

In a case where a plurality of single-phase two-wire cables are provided and PLC is performed in different signal bands using different cables, communication apparatus 11 of charger 50 need not perform relay processing on a PLC signal transmitted and received between communication apparatus 12 of station 41 and communication apparatus 13 of e-scooter 43. When the PLC signal leaks from the cable and interferes with (is superimposed on) another cable, however, communication apparatus 11 of charger 50 may perform relay processing on the PLC signal.

Communication apparatus 11 of charger 50 may perform relay processing on a PLC signal transmitted to communication apparatus 11 of another charger 50. For example, communication apparatus 11 of charger 50-4 illustrated in FIG. 20 that performs PLC in signal band B may perform relay processing on a PLC signal transmitted from communication apparatus 12b of station 41 that performs PLC in signal band B to communication apparatus 11 of charger 50-n that performs PLC in signal band B.

Embodiment 6

In Embodiment 6, a case with three-phase three-wire cables will be described.

Figure 21:
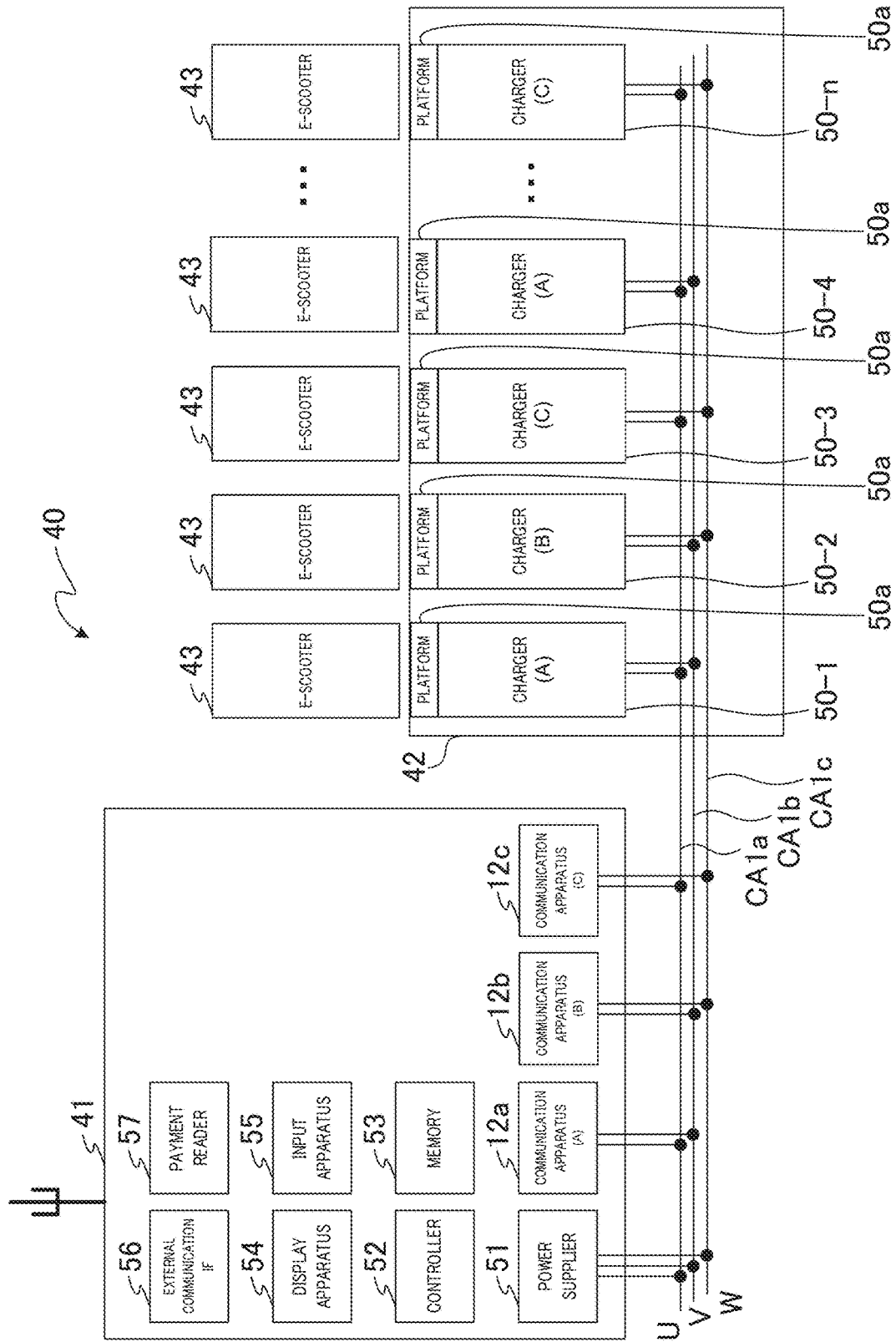
FIG. 21 illustrates an exemplary configuration of the mobility charging system according to Embodiment 6.

FIG. 21 illustrates an exemplary configuration of mobility charging system 40 according to Embodiment 6. FIG. 21 illustrates exemplary block configurations of station 41, stand 42, and e-scooters 43. In FIG. 21, the same components as those in FIG. 17 are denoted by the same reference signs. In the following, the difference from FIG. 17 will be described.

As illustrated in FIG. 21, mobility charging system 40 includes three-phase three-wire cables CA1a to CA1c. Cable CA1a is a U-phase cable. Cable CA1b is a V-phase cable. Cable CA1c is a W-phase cable. Power supplier 51 of station 41 supplies three-phase power to three-phase three-wire cables CA1a to CA1c.

Station 41 includes communication apparatuses 12a, 12b, and 12c. Communication apparatuses 12a, 12b, and 12c are respectively connected to cables CA1a to CA1c between different phases and perform PLC in different signal bands.

For example, communication apparatus 12a is connected to U-phase-V-phase cables CA1a and CA1b, and performs PLC in signal band A. Communication apparatus 12b is connected to V-phase-W-phase cables CA1b and CA1c, and performs PLC in signal band B. Communication apparatus 12c is connected to U-phase-W-phase cables CA1a and CA1c, and performs PLC in signal band C.

Chargers 50-1, 50-2, 50-3, 50-4, . . . , 50-n of stand 42 each include communication apparatus 11 as described in FIG. 17. Adjacent communication apparatuses 11 of chargers 50-1, 50-2, 50-3, 50-4, . . . , 50-n are connected to cables CA1a to CA1c between different phases and perform PLC in different signal bands.

For example, communication apparatus 11 of charger 50-1 is connected to U-phase-V-phase cables CA1a and CA1b, and performs PLC in signal band A. Communication apparatus 11 of charger 50-2 is connected to V-phase-W-phase cables CA1b and CA1c, and performs PLC in signal band B. Communication apparatus 11 of charger 50-3 is connected to U-phase-W-phase cables CA1a and CA1c, and performs PLC in signal band C. Communication apparatus 11 of charger 50-4 is connected to U-phase-V-phase cables CA1a and CA1b, and performs PLC in signal band A.

Communication apparatus 11 of charger 50 performs PLC with communication apparatus 12 of station 41 connected to the same-phase cables from CA1a to CA1c. For example, communication apparatus 11 of charger 50 connected to U-phase-V-phase cables CA1a and CA1b performs PLC with communication apparatus 12a of station 41.

Communication apparatus 11 of charger 50 connected to V-phase-W-phase cables CA1b and CA1c performs PLC with communication apparatus 12b of station 41. Communication apparatus 11 of charger 50 connected to U-phase-W-phase cables CA1a and CA1c performs PLC with communication apparatus 12c of station 41.

As described in Embodiment 4, communication apparatus 13 of e-scooter 43 may be propped up on stand 42 in a position corresponding to charger 50 using signal band A, or may be propped up on stand 42 in a position corresponding to charger 50 using signal band B. Thus, communication apparatus 13 of e-scooter 43 illustrated in FIG. 21 has a function of performing PLC in a plurality of signal bands and determines a channel to be used for PLC, as is the case with communication apparatus 13 of e-scooter 43 in Embodiment 4.

As described above, adjacent chargers 50 in mobility charging system 40 are respectively connected to three-phase three-wire cables CA1a to CA1c in which the signal bands of PLC signals are different from each other. This prevents interference in radio communication between charger 50 and e-scooter 43 in mobility charging system 40.

In a case where PLC is performed in different signal bands between different phases, communication apparatus 11 of charger 50 need not perform relay processing on a PLC signal transmitted and received between communication apparatus 12 of station 41 and communication apparatus 13 of e-scooter 43. Communication apparatus 11 of charger 50 need not perform relay processing on a PLC signal when, for example, PLC in single signal band A is performed in U-phase-V-phase cables CA1a and CA1b, PLC in single signal band B is performed in V-phase-W-phase cables CA1b and CA1c, and PLC in single signal band C is performed in U-phase-W-phase cables CA1a and CA1c, as illustrated in FIG. 21. When the PLC signal leaks from the cable and interferes with (is superimposed on) another cable, however, communication apparatus 11 of charger 50 may perform relay processing on the PLC signal.

Communication apparatus 11 of charger 50 may perform relay processing on a PLC signal transmitted to communication apparatus 11 of another charger 50. For example, communication apparatus 11 of charger 50-3 illustrated in FIG. 21 that performs PLC in signal band C may perform relay processing on a PLC signal transmitted from communication apparatus 12c of station 41 that performs PLC in signal band C to communication apparatus 11 of charger 50-n that performs PLC in signal band C.

In addition, communication apparatus 11 of charger 50 may automatically determine a channel for performing PLC. In this case, communication apparatus 11 of charger 50 is configured to receive a hello packet including a predetermined number of hops. Communication apparatus 11 of charger 50 receives a hello packet including a predetermined number of hops, and performs channel determination for performing PLC based on the reception quality of the received hello packet.

For example, it is assumed that communication apparatuses 11 of chargers 50-1 and 50-2 in FIG. 21 perform no relay processing on a PLC signal. It is also assumed that communication apparatus 11 of charger 50-3 performs relay processing on a PLC signal in signal band C transmitted from communication apparatus 12c of station 41 to communication apparatus 11 of charger 50-n.

In this case, the PLC signal in signal band C received by communication apparatus 11 of charger 50-4 adjacent to charger 50-3 sometimes has greater power than a PLC signal in signal band A. This possibility causes communication apparatus 11 of charger 50-4 to accidentally select signal band C as the channel instead of signal band A.

In this regard, communication apparatus 11 of charger 50-4 is configured in advance to receive a hello packet with hop count of 1. This allows communication apparatus 11 of charger 50-4 to exclude a hello packet with hop count of 2 in signal band A subjected to relay processing by communication apparatus 11 of charger 50-3, and to perform channel determination based on the reception quality of hello packets with hop count of 1 in signal bands A to C. As a result, communication apparatus 11 of charger 50-4 is less likely to select an inappropriate channel. Alternatively, comparison of hello packets with the same hop count also prevents inappropriate channel selection.

Embodiment 7

In Embodiment 7, a description will be given of an example of forming a single PLC network by connecting a plurality of PLC networks via communication apparatuses that perform radio communication according to the present disclosure.

Figure 22:
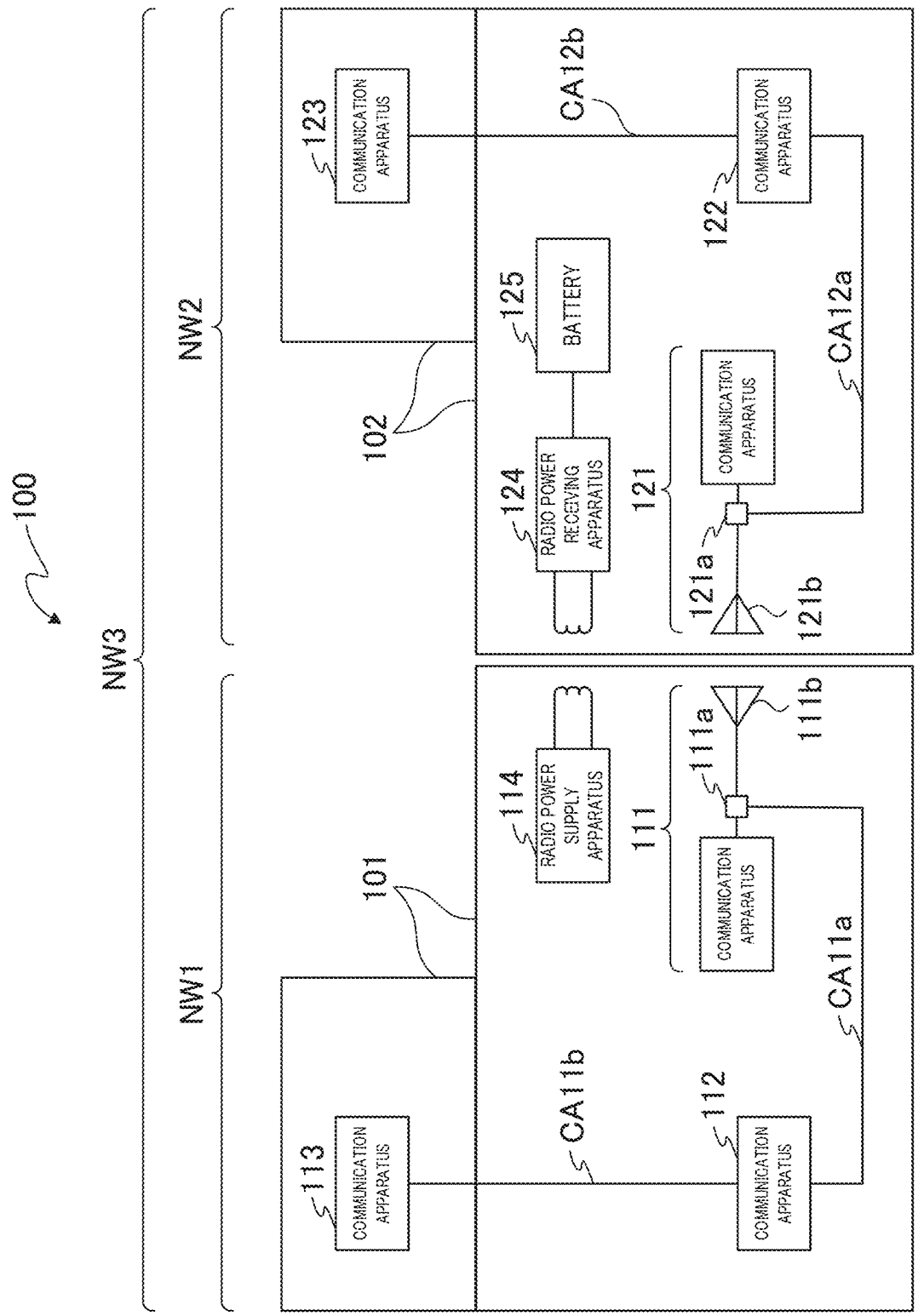
FIG. 22 illustrates an exemplary configuration of a PLC network according to Embodiment 7.

FIG. 22 illustrates an exemplary configuration of PLC network 100 according to Embodiment 7. FIG. 22 illustrates facility 101 and mobility 102. Facility 101 is, for example, a power supply facility that supplies power to mobility 102. Mobility 102 is, for example, a vehicle or a vessel. The vehicle is, for example, an e-scooter, an electric bicycle, or an automobile.

As illustrated in FIG. 22, facility 101 includes communication apparatuses 111 to 113, radio power supply apparatus 114, and cables CA11a and CA11b.

Communication apparatus 111 includes coupler 111a and antenna 111b. Communication apparatus 111 is, for example, communication apparatus 11 described in Embodiment 1, and coupler 111a and antenna 111b correspond to coupler 22 and antenna 23 described in Embodiment 1.

Communication apparatuses 112 and 113 are, for example, communication apparatuses 12 described in Embodiment 1.

Radio power supply apparatus 114 supplies power to mobility 102. Radio power supply apparatus 114 includes, for example, power source 32a-2, inverter 32a-3, and coil 32a-4 that are described in FIG. 6.

Communication apparatus 111 and communication apparatus 112 are connected to each other via coupler 111a and cable CA11a. Communication apparatus 112 and communication apparatus 113 are connected to each other via cable CA11b. Communication apparatuses 111, 112, and 113 perform PLC and form PLC network NW1.

As illustrated in FIG. 22, mobility 102 includes communication apparatuses 121 to 123, radio power receiving apparatus 124, battery 125, and cables CA12a and CA12b.

Communication apparatus 121 includes coupler 121a and antenna 121b. Communication apparatus 121 is, for example, communication apparatus 11 described in Embodiment 1, and coupler 121a and antenna 121b correspond to coupler 22 and antenna 23 described in Embodiment 1.

Communication apparatuses 122 and 123 are, for example, communication apparatuses 12 described in Embodiment 1.

Radio power receiving apparatus 124 receives power supplied from facility 101. Radio power receiving apparatus 124 includes, for example, coil 33a-2 and bridge rectifier circuit 33a-3 described in FIG. 6. Radio power receiving apparatus 124 receives power transmitted from radio power supply apparatus 114 and charges battery 125.

Communication apparatus 121 and communication apparatus 122 are connected to each other via coupler 121a and cable CA12a. Communication apparatus 122 and communication apparatus 123 are connected to each other via cable CA12b. Communication apparatuses 121, 122, and 123 perform PLC and form PLC network NW2.

Cable CA11a of facility 101 and cable CA12a of mobility 102 are connected to each other via coupler 111a and antenna 111b of communication apparatus 111 and coupler 121a and antenna 112b of communication apparatus 121. That is, PLC network NW1 and PLC network NW2 are connected through radio communication by communication apparatuses 111 and 121. That is, communication apparatuses 111 and 121 bridge PLC network NW1 and PLC network NW2 via coils (antennas 111b and 121b) and form single PLC network NW3.

As described above, communication apparatuses 111 and 121 can form single PLC network NW3 by bridging a plurality of PLC networks NW1 and NW2.

Note that mobility 102 may be a terminal such as a smartphone, a tablet, or a cell phone.

In the embodiments described above, " . . . er (or)" used for each component may be replaced with another term such as " . . . circuit (circuitry)", " . . . assembly", " . . . device", "unit" and " . . . module". In addition, the station described above may be referred to as a control apparatus, for example. The charger including communication apparatus 11 may be referred to as an electric device (first electric device), for example. The terminal and e-scooter receiving power transmitted from the charger may be referred to as an electric device (second electric device), for example. The mobility charging system may be referred to as an authentication system. Charger 90 including antenna 91 may be referred to as an electric device (third electric device), for example.

Although various embodiments have been described above with reference to the drawings, (it goes without saying that) the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present application claims a priority on the basis of U.S. provisional application No. 63/139,667, filed on Jan. 20, 2021. The disclosure of U.S. provisional application No. 63/139,667 is incorporated herein by reference in its entirety.

INDUSTRIAL APPLICABILITY

The present disclosure is applicable to a system authorizing and charging an electric device.

REFERENCE SIGNS LIST

1 Communication system
11, 12, 12a to 12c, 13, 111 to 113, 121 to 123 Communication apparatus
21 PLC
22, 22a to 22c, 111a, 121a Coupler
23, 13c, 121b Antenna
30 Terminal charging system
31 Base unit
32a to 32c, 50-1, 50-2, 50-3, 50-4, . . . , 50-n Charger
33a to 33c Terminal
40 Mobility charging system
41 Station
42 Stand
43 E-scooter
45 Server
CA1, CA1a to CA1c Cable

The invention claimed is:

1. A communication apparatus, comprising:
a coupler that is connected to a cable to which a first communication apparatus is connected, the first communication apparatus performing communication based on a wired communication scheme;
communication circuitry that is connected to the coupler;
an antenna that is connected to the coupler; and
power source circuitry, which, in operation, receives direct current power from the cable and supplies power to the communication circuitry,
wherein the antenna, in operation, radiates a signal of the wired communication scheme to a second communication apparatus, and receives a signal of the wired communication scheme from the second communication apparatus,
wherein the coupler, in operation:
outputs, to the cable and the antenna, the signal of the wired communication scheme outputted from the communication circuitry,
outputs, to the communication circuitry and the cable, the signal of the wired communication scheme received by the antenna, and
outputs, to the communication circuitry and the antenna, the signal of the wired communication scheme received from the cable, and
wherein the coupler comprises a capacitor that, in operation, prevents inflow of the direct current power to the communication circuitry and the antenna.

2. The communication apparatus according to claim 1, wherein the antenna is a coil.

3. The communication apparatus according to claim 1, wherein the communication circuitry, in operation, performs relay processing on signals in accordance with a protocol of the wired communication scheme, the signals including a signal transmitted from the first communication apparatus to the second communication apparatus and a signal transmitted from the second communication apparatus to the first communication apparatus.

4. The communication apparatus according to claim 1, wherein the cable is a twisted pair line, a coaxial line, or a parallel line.

5. The communication apparatus according to claim 4, wherein the power source circuitry is also connected to a power line different from the cable.

6. The communication apparatus according to claim 1, wherein a wiring distance between the communication circuitry and the antenna connected via the coupler is shorter than a length of the cable connecting the communication apparatus and the first communication apparatus.

7. The communication apparatus according to claim 1, wherein the wired communication scheme is power line communication (PLC).

8. A communication apparatus, comprising:
a coupler that is connected to a cable to which a first communication apparatus is connected, the first communication apparatus performing communication based on a wired communication scheme;
communication circuitry that is connected to the coupler;
an antenna that is connected to the coupler; and
power source circuitry, which, in operation, receives alternating current power from the cable and supplies power to the communication circuitry,
wherein the antenna, in operation, radiates a signal of the wired communication scheme to a second communication apparatus, and receives a signal of the wired communication scheme from the second communication apparatus,
wherein the coupler, in operation:
outputs, to the cable and the antenna, the signal of the wired communication scheme outputted from the communication circuitry,
outputs, to the communication circuitry and the cable, the signal of the wired communication scheme received by the antenna, and
outputs, to the communication circuitry and the antenna, the signal of the wired communication scheme received from the cable; and wherein the coupler comprises a transformer that, in operation, electrically isolates the communication circuitry and the antenna from the cable.

9. The communication apparatus according to claim 8, wherein the antenna is a coil.

10. The communication apparatus according to claim 8, wherein the communication circuitry, in operation, performs relay processing on signals in accordance with a protocol of the wired communication scheme, the signals including a signal transmitted from the first communication apparatus to the second communication apparatus and a signal transmitted from the second communication apparatus to the first communication apparatus.

11. The communication apparatus according to claim 8, wherein the cable is a twisted pair line, a coaxial line, or a parallel line.

12. The communication apparatus according to claim 11, wherein the power source circuitry is also connected to a power line different from the cable.

13. The communication apparatus according to claim 8, wherein a wiring distance between the communication circuitry and the antenna connected via the coupler is shorter than a length of the cable connecting the communication apparatus and the first communication apparatus.

14. The communication apparatus according to claim 8, wherein the wired communication scheme is power line communication (PLC).

\* \* \* \* \*